(12) United States Patent
Russell

(10) Patent No.: US 7,896,747 B2
(45) Date of Patent: Mar. 1, 2011

(54) TILTROTOR AIRCRAFT DRIVELINK

(75) Inventor: Donald D. Russell, Fairview, PA (US)

(73) Assignee: LORD Corporation, Cary, NC (US)

( * ) Notice: Subject to any disclaimer, the term of this patent is extended or adjusted under 35 U.S.C. 154(b) by 72 days.

(21) Appl. No.: 11/782,891

(22) Filed: Jul. 25, 2007

(65) Prior Publication Data

US 2008/0023586 A1 Jan. 31, 2008

Related U.S. Application Data

(60) Provisional application No. 60/833,221, filed on Jul. 25, 2006.

(51) Int. Cl.
*F16D 3/70* (2006.01)

(52) U.S. Cl. .............................. 464/70; 464/72

(58) Field of Classification Search .............. 464/69–72, 464/90; 403/203, 225, 369
See application file for complete search history.

(56) References Cited

U.S. PATENT DOCUMENTS

| | | | |
|---|---|---|---|
| 1,752,138 A | 3/1930 | Ainsworth |
| 1,894,507 A | 1/1933 | Ainsworth |
| 2,292,675 A | 8/1942 | Thiry |
| 2,752,766 A | 7/1956 | Wildhaber |
| 2,837,901 A | 6/1958 | Chapman |
| 2,995,907 A | 8/1961 | Orain |
| 3,282,350 A | 11/1966 | Kisovec |
| 3,679,197 A | 7/1972 | Schmidt |
| 3,787,102 A | 1/1974 | Moran |
| 3,804,552 A | 4/1974 | Covington |

(Continued)

FOREIGN PATENT DOCUMENTS

BE 545880 3/1956

(Continued)

OTHER PUBLICATIONS

International Search Report and Written Opinion dated Oct. 23, 2008 from corresponding PCT International Application No. PCT/US2007/074317.

(Continued)

*Primary Examiner* — Greg Binda
(74) *Attorney, Agent, or Firm* — Edward F. Murphy

(57) ABSTRACT

Tiltrotor aircraft drivelink includes a nonelastomeric outer drivelink member with a first linkend and a distal second linkend. The tiltrotor aircraft drivelink first linkend has a first linkend cavity with a first linkend cavity inner circumferential bonding surface, and a first linkend nonelastomeric inner member contained in the first linkend cavity, the first linkend nonelastomeric inner member having a first linkend outer circumferential bonding surface, and a first linkend elastomeric intermediate having an outer circumferential elastomeric bonding surface and an inner circumferential elastomeric bonding surface, the outer circumferential elastomeric bonding surface bonded to the first linkend cavity inner circumferential bonding surface and the inner circumferential elastomeric bonding surface bonded to the first linkend outer circumferential bonding surface, the elastomeric intermediate containing N nonelastomeric outboard bonded shims and no more than N−1 nonelastomeric inboard bonded shims. The tiltrotor aircraft drivelink second linkend has a second linkend cavity with a second linkend cavity inner circumferential bonding surface, and a second linkend nonelastomeric inner member contained in the second linkend cavity, the second linkend nonelastomeric inner member having a second linkend outer circumferential bonding surface, and a second linkend elastomeric intermediate having an outer circumferential elastomeric bonding surface and an inner circumferential elastomeric bonding surface, the outer circumferential elastomeric bonding surface bonded to the second linkend cavity inner circumferential bonding surface and the inner circumferential elastomeric bonding surface bonded to the second linkend outer circumferential bonding surface, the second elastomeric intermediate containing N nonelastomeric outboard bonded shims and no more than N−1 nonelastomeric inboard bonded shims.

8 Claims, 38 Drawing Sheets

U.S. PATENT DOCUMENTS

| | | | |
|---|---|---|---|
| 4,040,270 | A | 8/1977 | Chivari |
| 4,588,388 | A | 5/1986 | Chivari |
| 4,729,753 | A | 3/1988 | Neathery et al. |
| 4,804,352 | A | 2/1989 | Schmidt |
| 5,108,045 | A | 4/1992 | Law et al. |
| 5,186,686 | A | 2/1993 | Staples et al. |
| 6,296,444 | B1 | 10/2001 | Schellhase et al. |

FOREIGN PATENT DOCUMENTS

| | | |
|---|---|---|
| DE | 1096691 | 1/1961 |
| DE | 2902991 | 8/1980 |
| EP | 0306027 A2 | 3/1989 |
| GB | 2115080 A | 9/1983 |
| SU | 473859 | 1/1973 |

OTHER PUBLICATIONS http://www.navair.navy.mil/v22, "V22 Osprey Web", Jul. 17, 2006, pp. 1-2.

http://www.navair.navy.mil/v22/index.cfm?fuseaction=aircraft, "V22 Osprey Web," Jul. 17, 2006, pp. 1-2.

http://www.airforce-technology.com/project_printable.asp-?ProjectID=1158, V-11 Osprey Medium-Lift, Multi-Mission, Tilt-Rotor Aircraft, USA, Jul. 17, 2006, pp. 1-3.

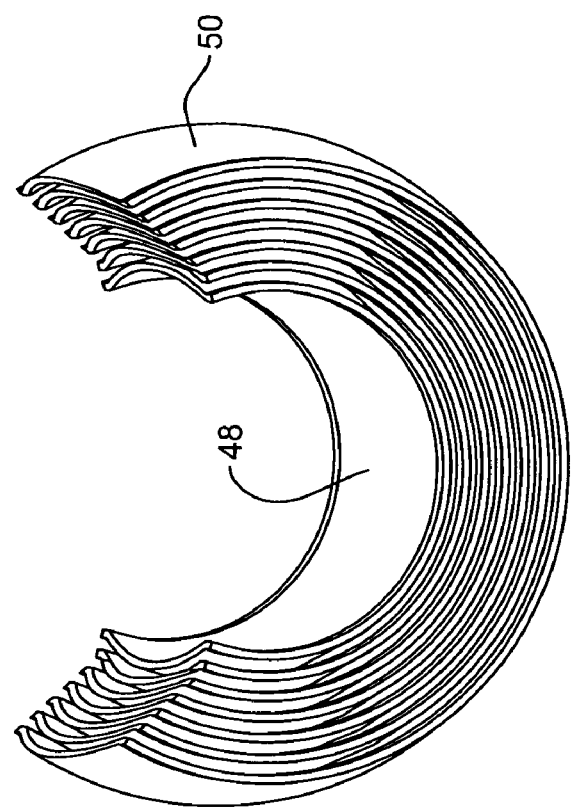
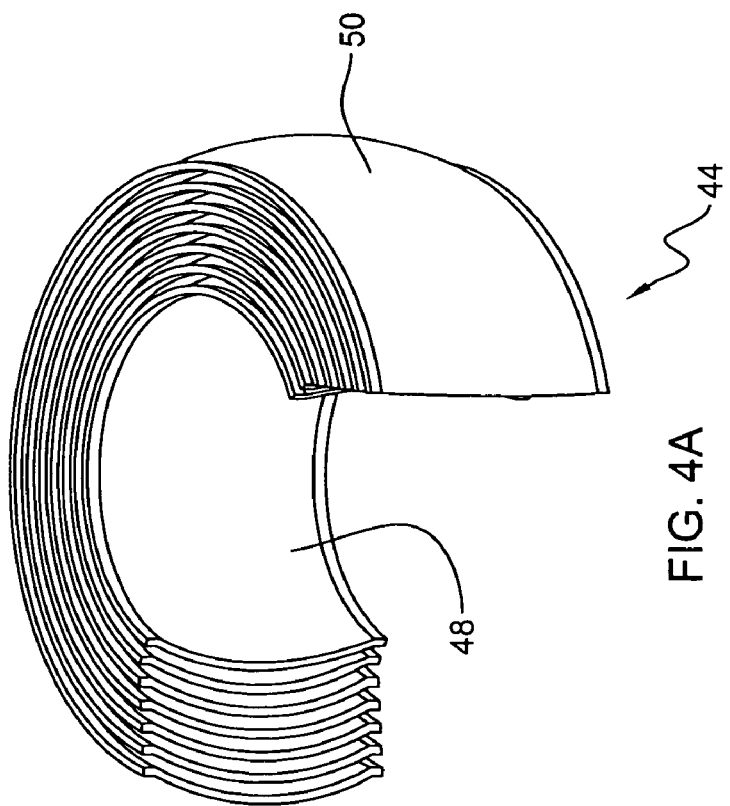
FIG. 4B
FIG. 4A

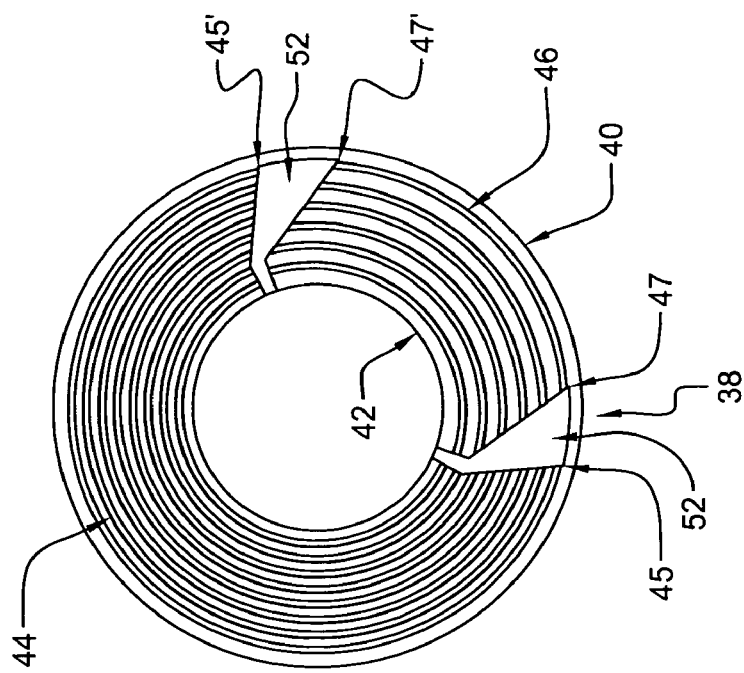
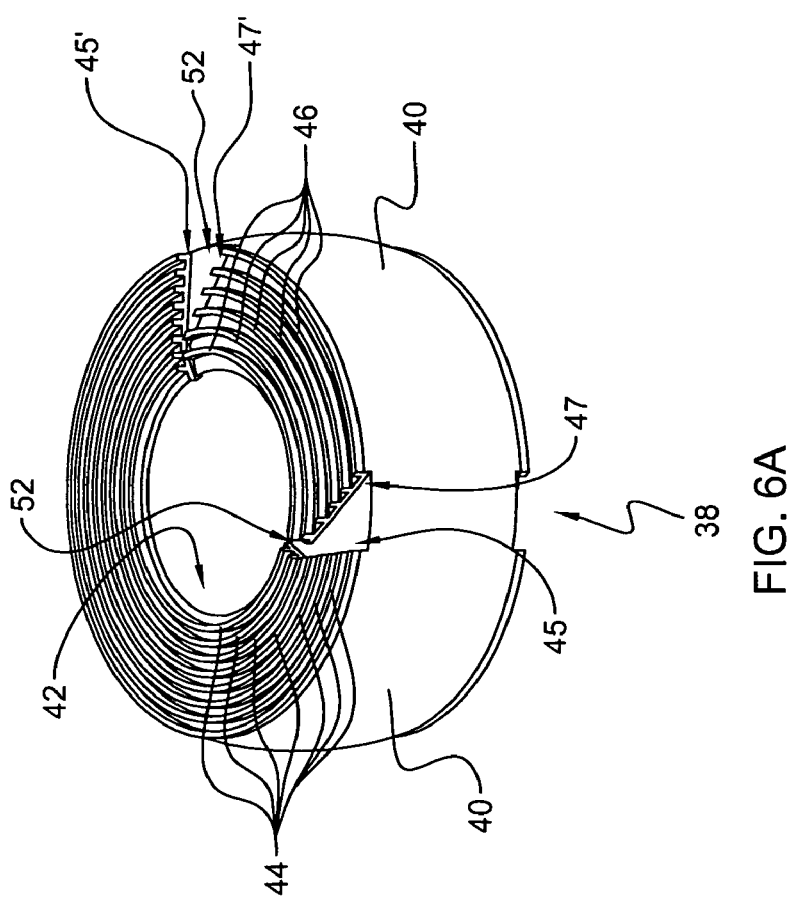
FIG. 6B
FIG. 6A

TILTROTOR AIRCRAFT DRIVELINK

CROSS REFERENCE

This application claims the benefit of, and incorporates by reference, U.S. Provisional Patent Application No. 60/833,221 filed Jul. 25, 2006.

FIELD OF THE INVENTION

The invention relates to the field of tiltrotor aircraft. The invention relates to the field of tiltrotor aircraft drivelinks. More particularly the invention relates to the field of tiltrotor aircraft drivelinks with elastomeric intermediate members.

BACKGROUND OF THE INVENTION

There is a need for tiltrotor aircraft drivelinks which are economically manufacturable and provide functional performance. There is a need for tiltrotor aircraft drivelinks and a method of accurately and economically providing drive linkage. There is a need for a robust tiltrotor aircraft drivelink system and method of making. There is a need for economic tiltrotor aircraft drivelinks and methods for making tiltrotor aircraft drivelinks.

SUMMARY OF THE INVENTION

In an embodiment the invention includes a tiltrotor aircraft drivelink. The tiltrotor aircraft drivelink includes a nonelastomeric outer drivelink member with a first linkend and a distal second linkend. The tiltrotor aircraft drivelink first linkend has a first linkend cavity with a first linkend cavity inner circumferential bonding surface. The linkend includes a first linkend nonelastomeric inner member contained in the first linkend cavity, the first linkend nonelastomeric inner member preferably having a first linkend outer circumferential bonding surface. The linkend includes a first linkend elastomeric intermediate having an outer circumferential elastomeric bonding surface and an inner circumferential elastomeric bonding surface with the outer circumferential elastomeric bonding surface bonded to the first linkend cavity inner circumferential bonding surface and the inner circumferential elastomeric bonding surface bonded to the first linkend outer circumferential bonding surface. The elastomeric intermediate preferably contains N (preferably N is a whole number $\geq 2$) nonelastomeric first side outboard bonded shims and no more than N-1 nonelastomeric second side inboard bonded shims. Preferably the tiltrotor aircraft drivelink second linkend has a second linkend cavity with a second linkend cavity inner circumferential bonding surface, and a second linkend nonelastomeric inner member contained in the second linkend cavity, with the second linkend nonelastomeric inner member having a second linkend outer circumferential bonding surface, and a second linkend elastomeric intermediate having an outer circumferential elastomeric bonding surface and an inner circumferential elastomeric bonding surface, the outer circumferential elastomeric bonding surface bonded to the second linkend cavity inner circumferential bonding surface and the inner circumferential elastomeric bonding surface bonded to the second linkend outer circumferential bonding surface. Preferably the second elastomeric intermediate contains N nonelastomeric outboard bonded shims and no more than N-1 nonelastomeric inboard bonded shims.

In an embodiment the invention includes a tiltrotor drivelink, the tiltrotor drivelink includes a nonelastomeric outer drivelink member with a first linkend and a distal second linkend. The drivelink first linkend has a first linkend cavity with a first linkend cavity inner circumferential bonding surface, and a first linkend nonelastomeric inner member contained in the first linkend cavity, the first linkend nonelastomeric inner member having a first linkend outer circumferential bonding surface. The linkend includes a first linkend elastomeric intermediate having an outer circumferential elastomeric bonding surface and an inner circumferential elastomeric bonding surface, the outer circumferential elastomeric bonding surface bonded to the first linkend cavity inner circumferential bonding surface and the inner circumferential elastomeric bonding surface bonded to the first linkend outer circumferential bonding surface, the elastomeric intermediate containing a plurality of first side shape factoring outboard bonded shims which provide a first side outboard load area $LA_O$ and a first side outboard bulge area $BA_O$, and the elastomeric intermediate contains a plurality of second side shape factoring inboard bonded shims which provide a second side inboard load area $LA_I$ and a second side inboard bulge area $BA_I$.

In an embodiment the invention includes a drivelink with a nonelastomeric rigid longitudinally extending outer drivelink member with a first linkend and a distal second linkend. The drivelink first linkend having a first linkend cavity with a first linkend cavity inner circumferential bonding surface with a center bore axis, and a first linkend nonelastomeric inner member contained in the first linkend cavity, the first linkend nonelastomeric inner member having a first linkend outer circumferential bonding surface and an inner member center bore axis. The linkend includes a first linkend elastomeric intermediate having an outer circumferential elastomeric bonding surface and an inner circumferential elastomeric bonding surface, the outer circumferential elastomeric bonding surface mold bonded to the first linkend cavity inner circumferential bonding surface and the inner circumferential elastomeric bonding surface mold bonded to the first linkend outer circumferential bonding surface, with the elastomeric intermediate containing N nonelastomeric metal outboard bonded shims and no more than N-1 nonelastomeric metal inboard bonded shims with the first linkend cavity center bore axis aligned with the inner member center bore axis.

In an embodiment the invention includes a drivelink with a nonelastomeric outer drivelink member with a first linkend and a distal second linkend. The drivelink first linkend has a first linkend cavity with a first linkend cavity inner circumferential bonding surface, and a first linkend nonelastomeric inner member contained in the first linkend cavity, the first linkend nonelastomeric inner member having a first linkend outer circumferential bonding surface, and a first linkend elastomeric intermediate having an outer circumferential elastomeric bonding surface and an inner circumferential elastomeric bonding surface, the outer circumferential elastomeric bonding surface bonded to the first linkend cavity inner circumferential bonding surface and the inner circumferential elastomeric bonding surface bonded to the first linkend outer circumferential bonding surface. The elastomeric intermediate contains N nonelastomeric metal inboard bonded shims and no more than N-1 nonelastomeric metal outboard bonded shims.

In an embodiment the invention includes a linkend with a nonelastomeric outer link housing member, the linkend having a linkend cavity with a linkend cavity inner circumferential bonding surface, and a linkend nonelastomeric inner member contained in the linkend cavity, the linkend nonelastomeric inner member having a linkend outer circumferential bonding surface, and a linkend elastomeric intermediate having an outer circumferential elastomeric bonding surface and an inner circumferential elastomeric bonding surface, the outer circumferential elastomeric bonding surface bonded to the linkend cavity inner circumferential bonding surface and the inner circumferential elastomeric bonding surface bonded to the linkend outer circumferential bonding surface, the elastomeric intermediate containing a plurality of shape factoring first side bonded shims which provide a first side outboard load area $LA_O$ and a first side bulge area $BA_O$, the elastomeric intermediate containing a plurality of shape factoring second side bonded shims which provide a second side load area $LA_I$ and an second side bulge area $BA_I$ wherein $(LA_O/BA_O) \neq (LA_I/BA_I)$.

In an embodiment the invention includes a linkend. The linkend includes a nonelastomeric outer link housing member. The linkend has a linkend cavity with a linkend cavity inner circumferential bonding surface. A linkend nonelastomeric inner member is contained in the linkend cavity. The linkend nonelastomeric inner member has a linkend outer circumferential bonding surface. The linkend includes a linkend elastomeric intermediate having an outer circumferential elastomeric bonding surface and an inner circumferential elastomeric bonding surface, the outer circumferential elastomeric bonding surface bonded to the linkend cavity inner circumferential bonding surface and the inner circumferential elastomeric bonding surface bonded to the linkend outer circumferential bonding surface. The elastomeric intermediate has a first side load area $LA_O$ and a first side bulge area $BA_O$, and a second side load area $LA_I$ and a second side bulge area $BA_I$ wherein $(LA_O/BA_O) > (LA_I/BA_I)$.

In an embodiment the invention includes a method of making a drivelink. The method includes providing a nonelastomeric outer drivelink member with a first linkend, the first linkend having a first linkend cavity with a first linkend cavity inner circumferential bonding surface. The method includes providing a first linkend nonelastomeric inner member, the first linkend nonelastomeric inner member having a first linkend outer circumferential bonding surface. The method includes bonding a first linkend elastomeric intermediate with an outer circumferential elastomeric bonding surface to the first linkend cavity inner circumferential bonding surface and an inner circumferential elastomeric bonding surface to the first linkend outer circumferential bonding surface, with the elastomeric intermediate containing N nonelastomeric outboard bonded shims and no more than N-1 nonelastomeric inboard bonded shims.

In an embodiment the invention includes a linkend. The linkend includes a nonelastomeric outer link housing member. The linkend has a linkend cavity with a linkend cavity inner circumferential bonding surface, and a linkend nonelastomeric inner member contained in the linkend cavity. The linkend nonelastomeric inner member has a linkend outer circumferential bonding surface. The linkend includes a linkend elastomeric intermediate having an outer circumferential elastomeric bonding surface and an inner circumferential elastomeric bonding surface, the outer circumferential elastomeric bonding surface bonded to the linkend cavity inner circumferential bonding surface and the inner circumferential elastomeric bonding surface bonded to the linkend outer circumferential bonding surface, a means for providing an elastomeric intermediate shape factoring first side load area $LA_O$ and an elastomeric intermediate shape factoring first side bulge area $BA_O$, and a means for providing an elastomeric intermediate shape factoring second side load area $LA_I$ and an elastomeric intermediate shape factoring second side bulge area $BA_I$, wherein $(LA_O/BA_O) > (LA_I/BA_I)$.

Preferably the linkend outer nonelastomeric housing cavity and the linkend nonelastomeric inner member have aligned concentric axes, preferably with a common center axis of the housing cavity linkend inner circumferential bonding surface and the linkend nonelastomeric inner member outer circumferential bonding surface, preferably with the plurality of nonelastomeric shims having a common axis, in alignment with the common center axis of the housing cavity linkend inner circumferential bonding surface and the linkend nonelastomeric inner member outer circumferential bonding surface, preferably with the nonelastomeric shim inner and outer circumferential segment bonding surfaces having aligned concentric axes.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principals and operation of the invention.

BRIEF DESCRIPTION OF THE DRAWINGS

FIGS. 4A-E show views of nonelastomeric shims.
FIGS. 6A-K show views of a linkend elastomeric intermediate.

DETAILED DESCRIPTION OF THE PREFERRED EMBODIMENT

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the present preferred embodiments of the invention, examples of which are illustrated in the accompanying drawings.

Figure 1A:
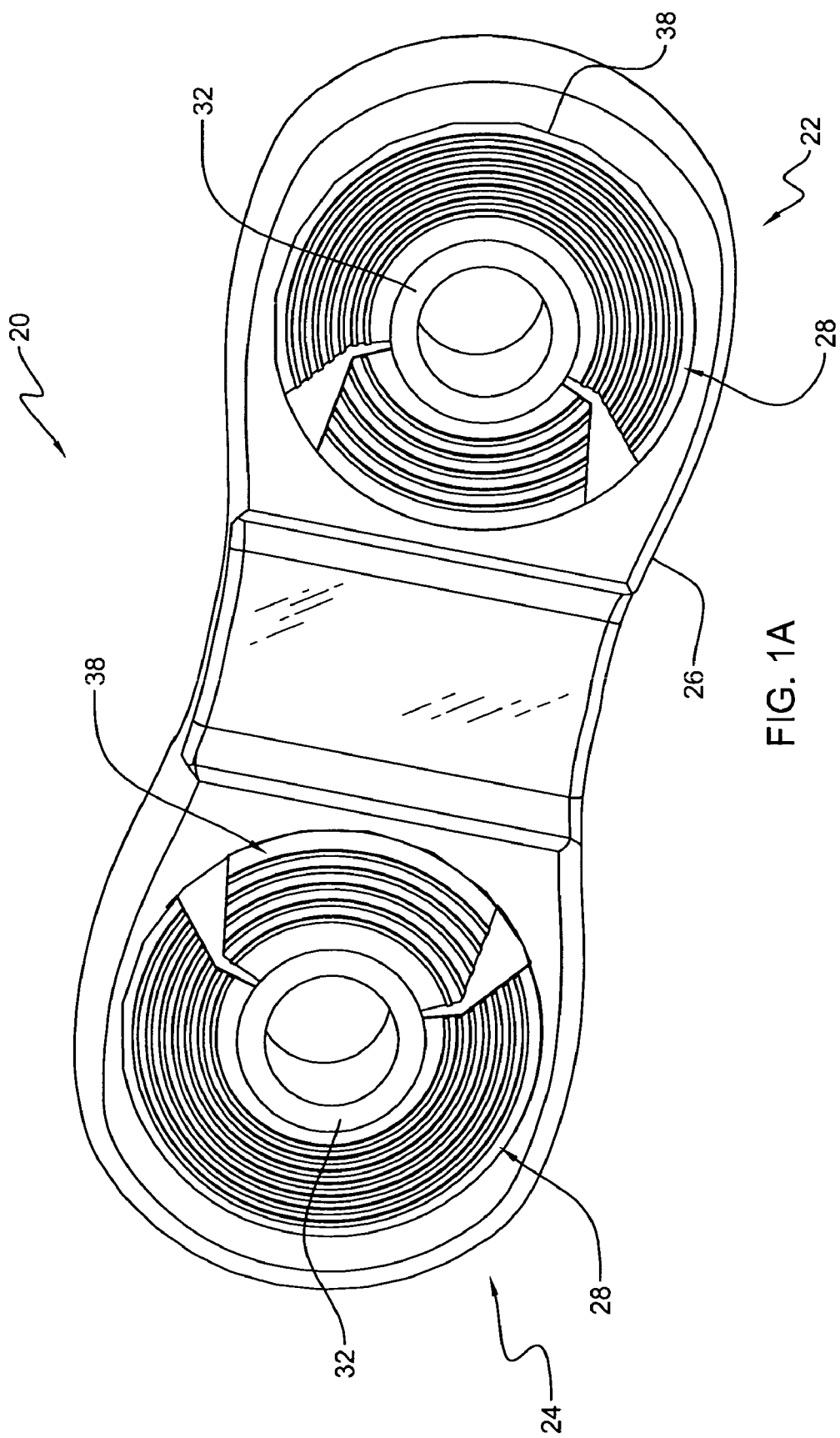
FIGS. 1A-J show views of a drivelink.
Figure 1B:
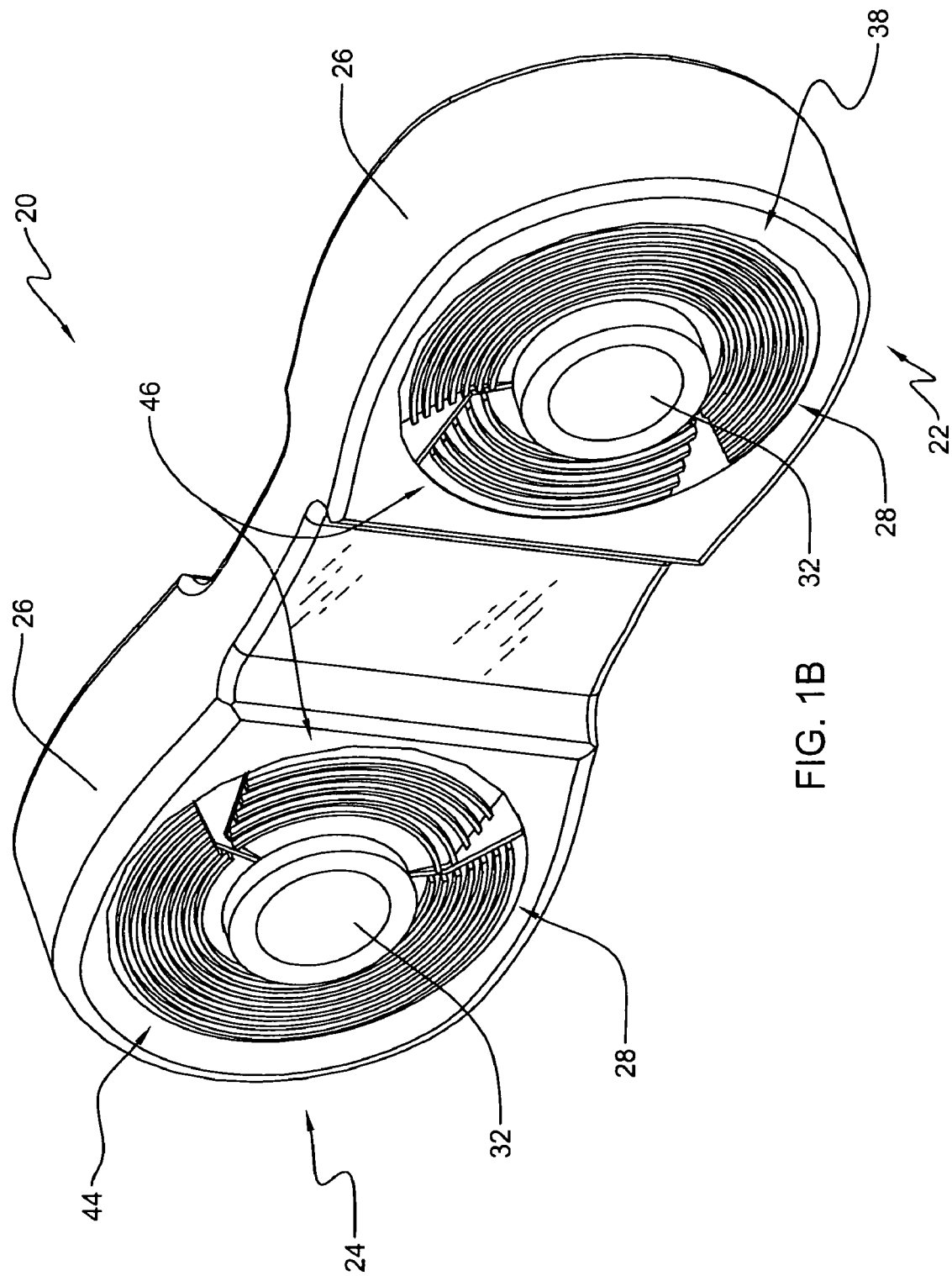
Figure 1C:
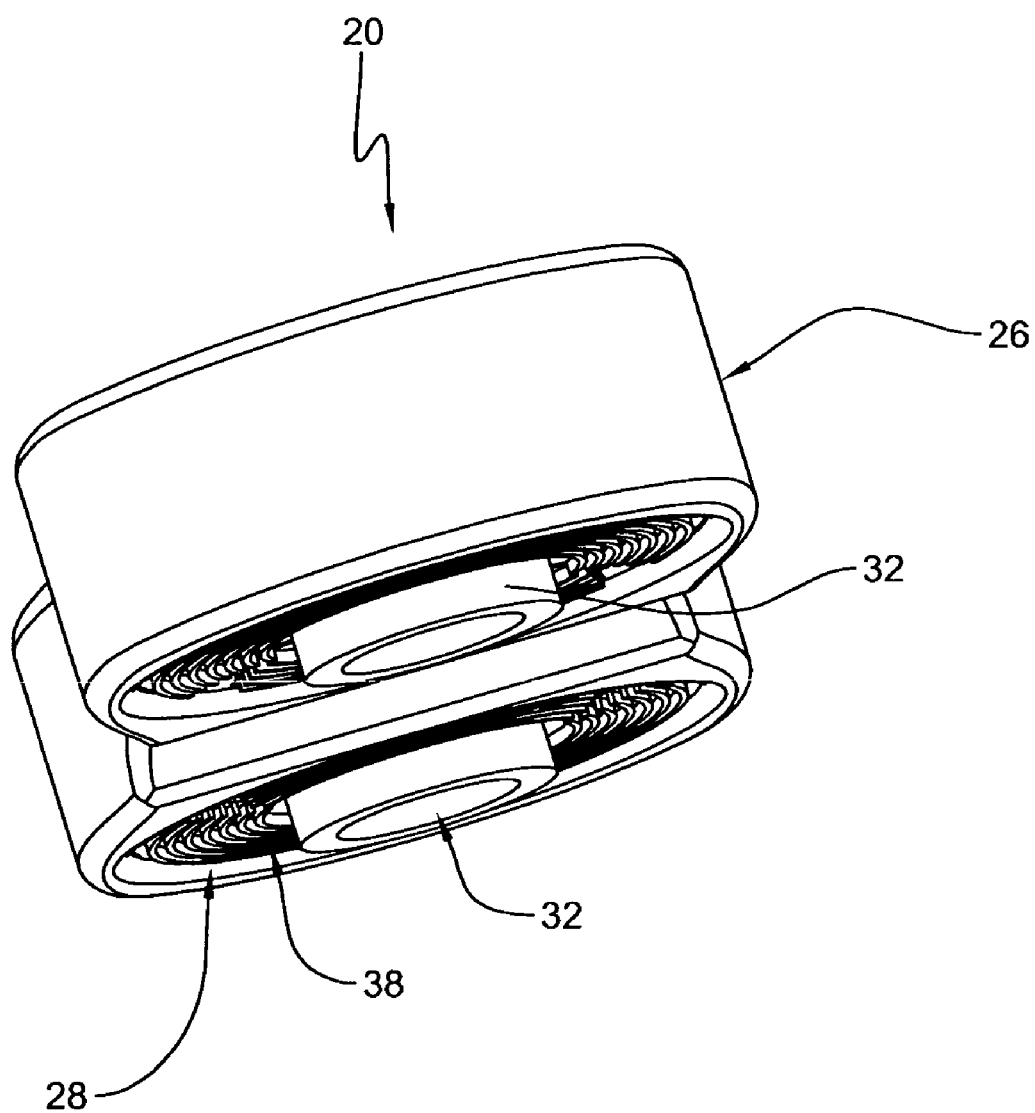
Figure 1D:
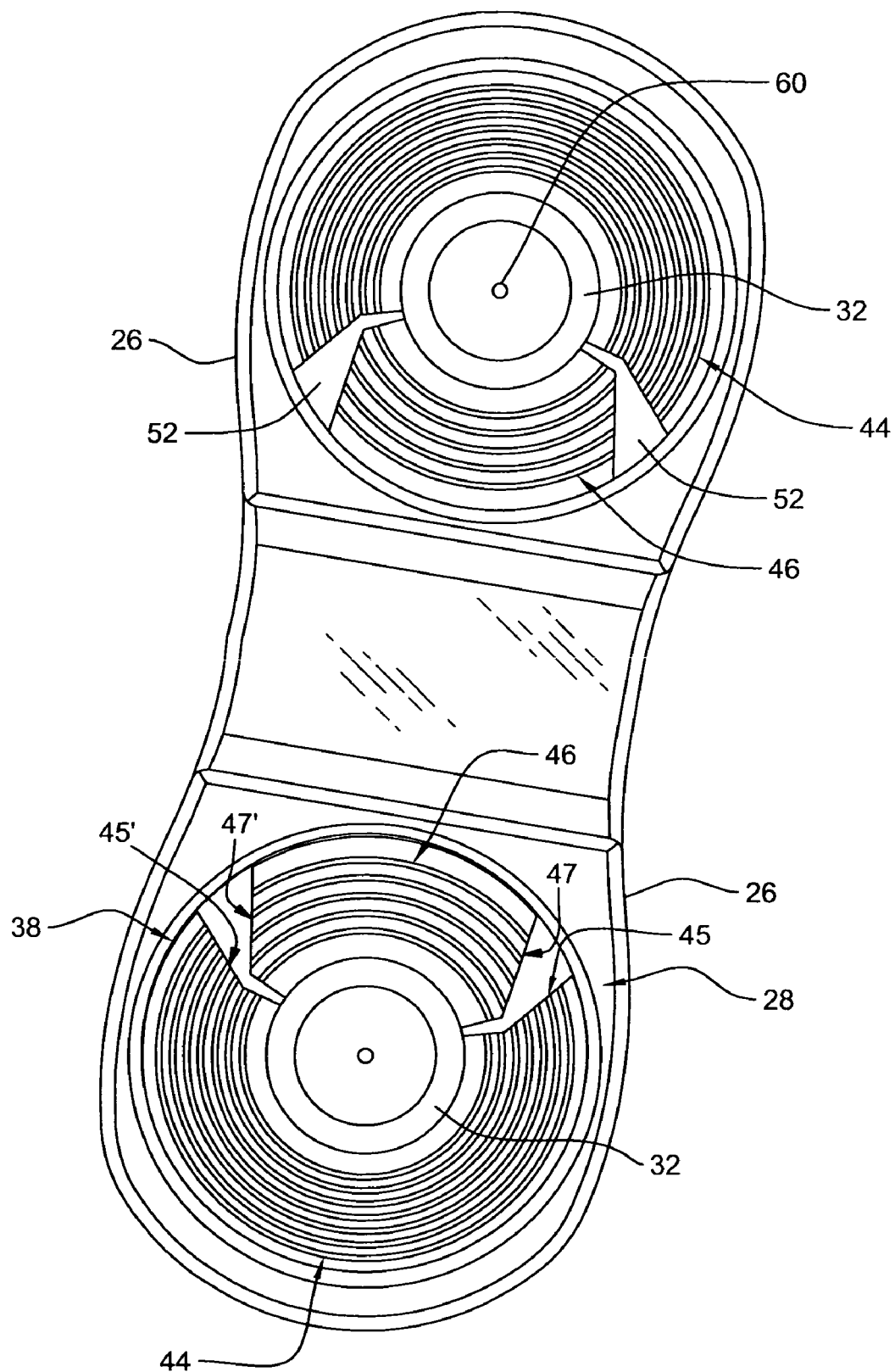
Figure 1E:
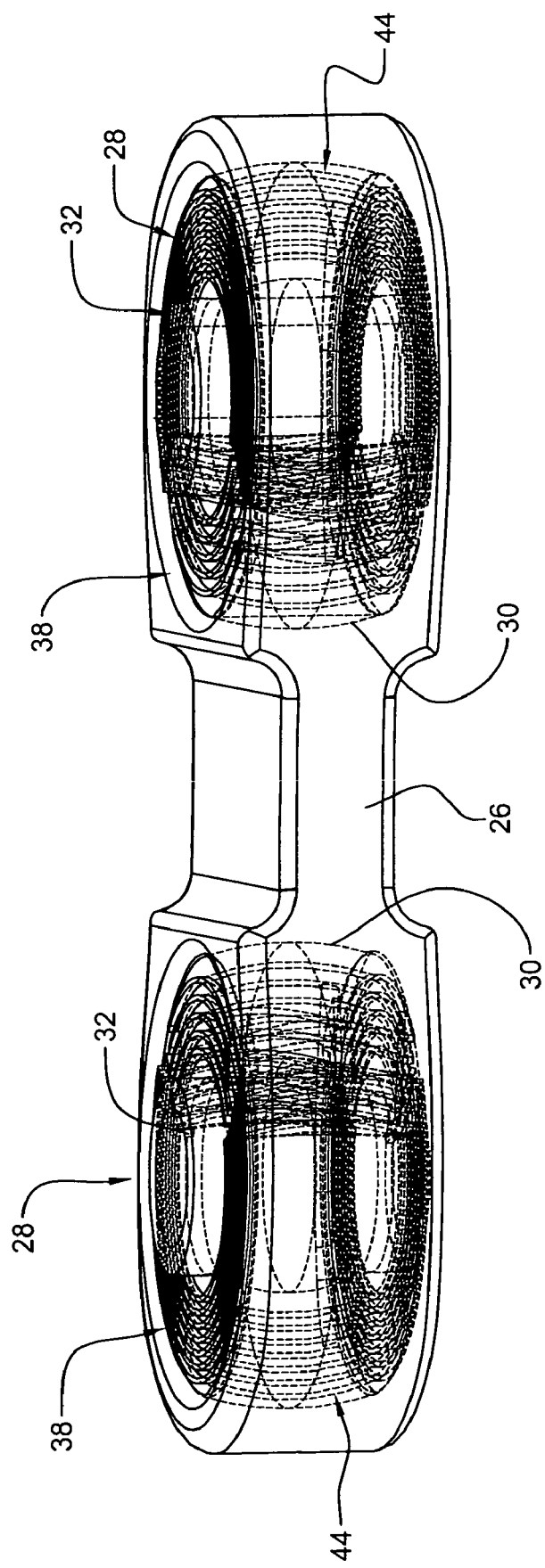
Figure 1F:
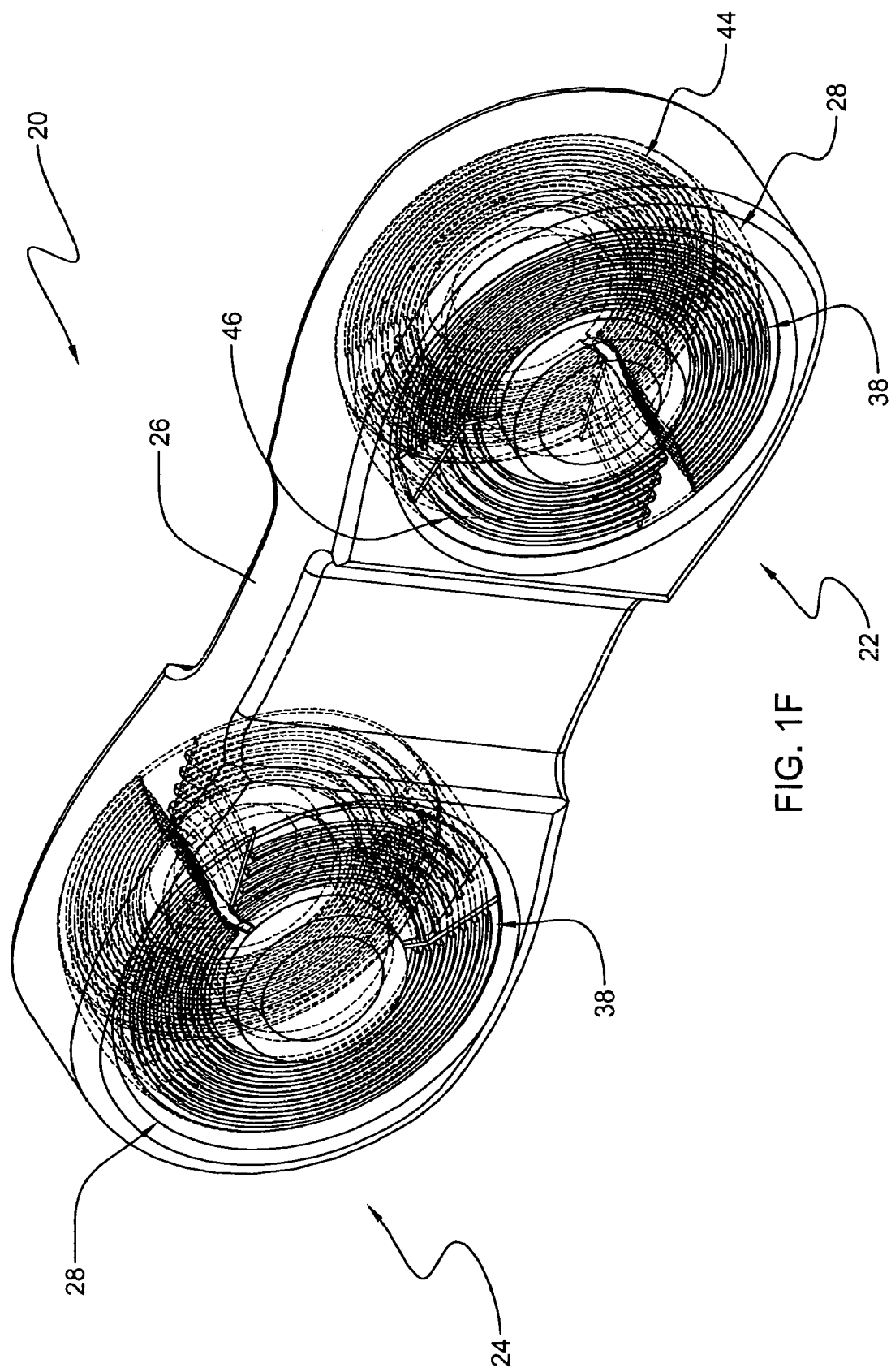
Figure 1G:
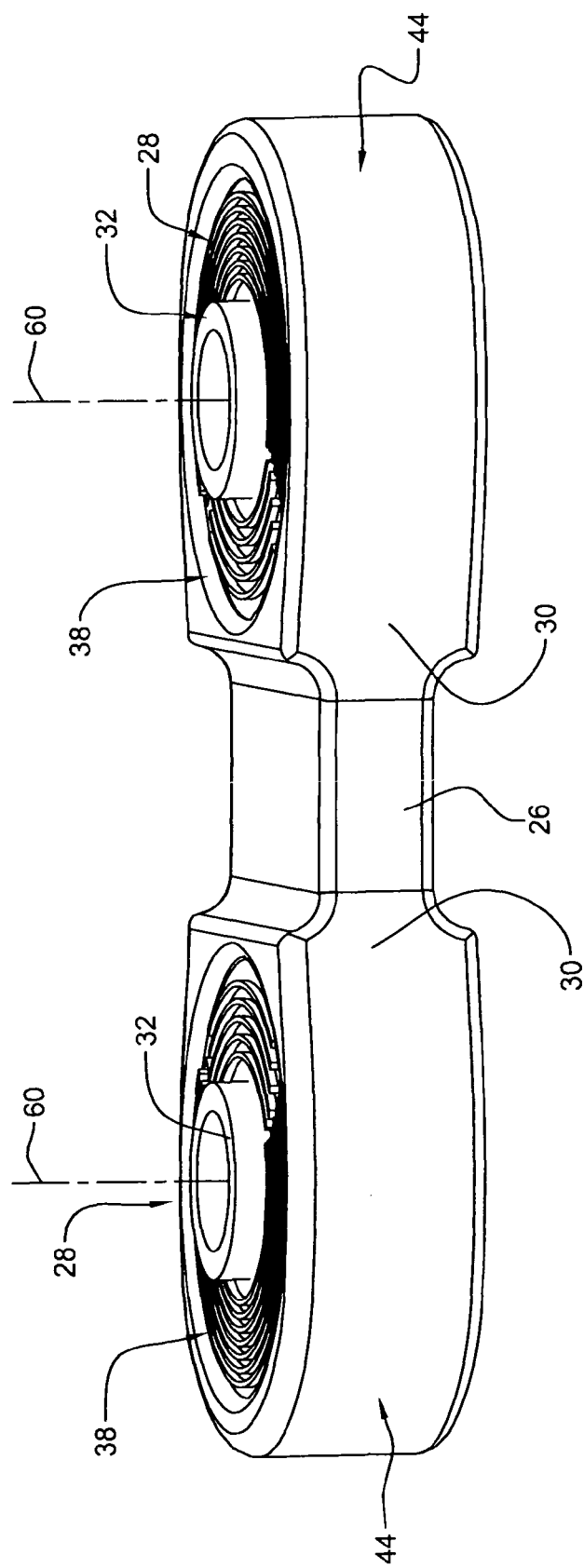
Figure 1H:
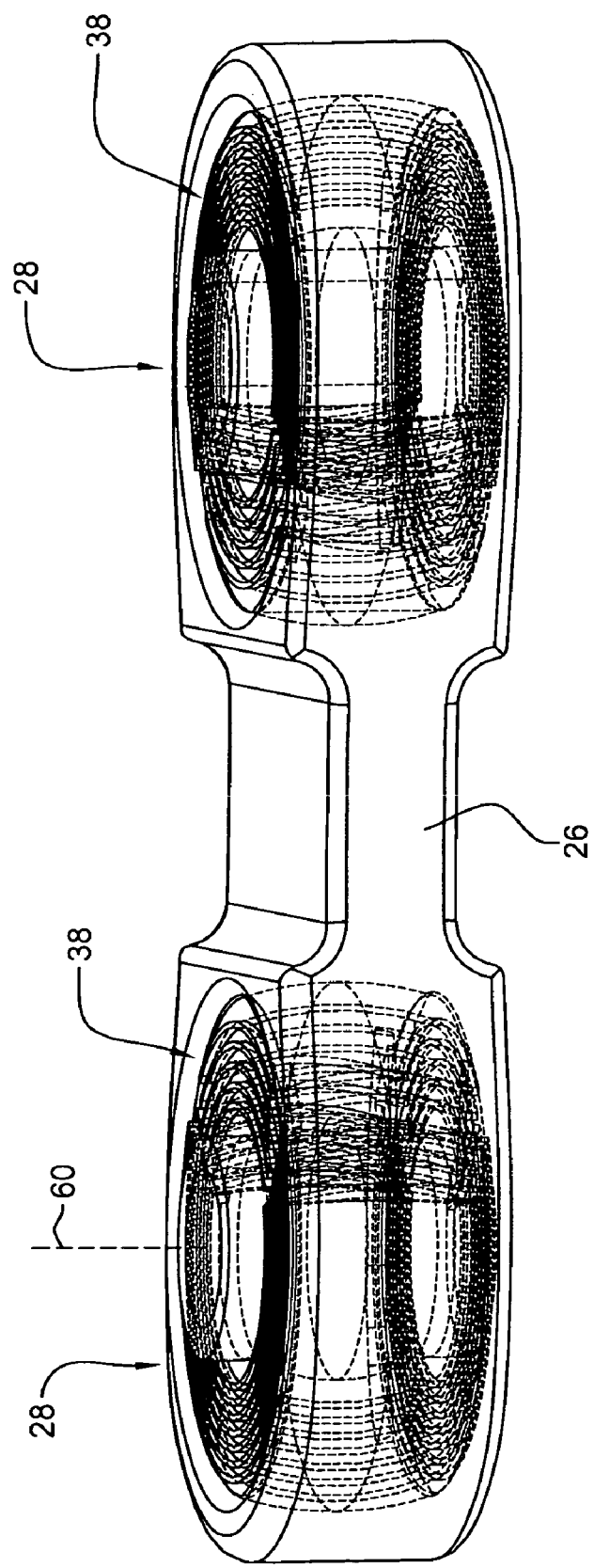
Figure 1I:
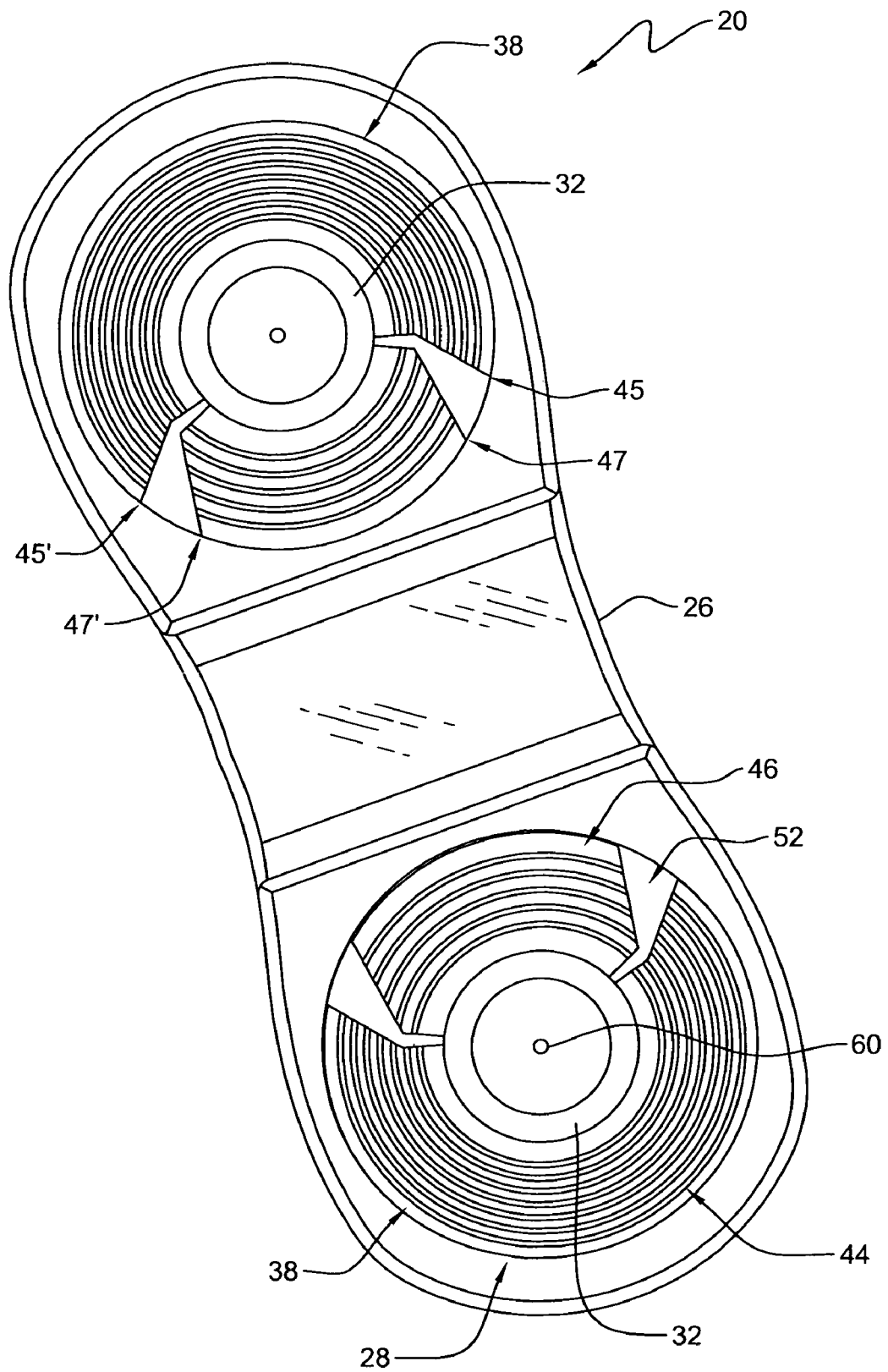
Figure 1J:
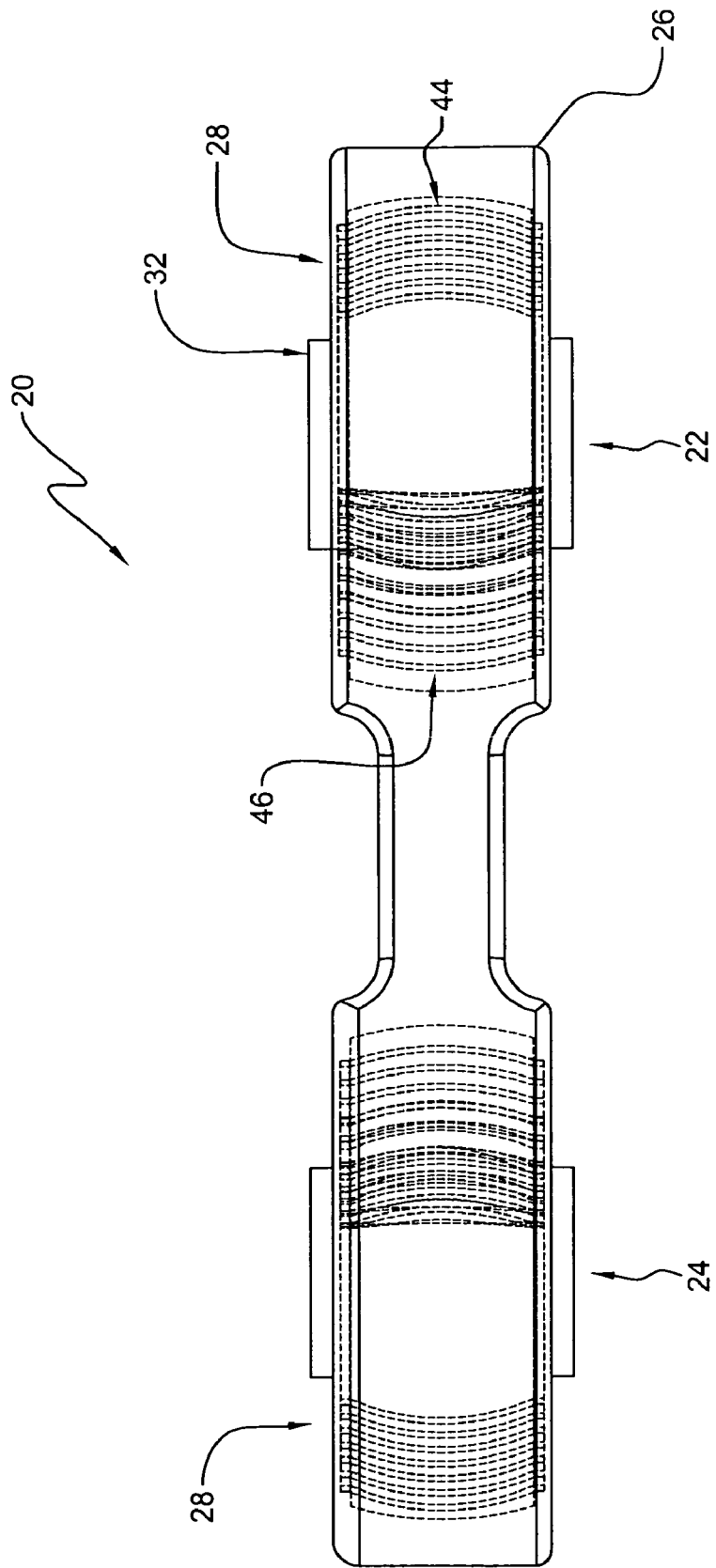
Figure 2B:
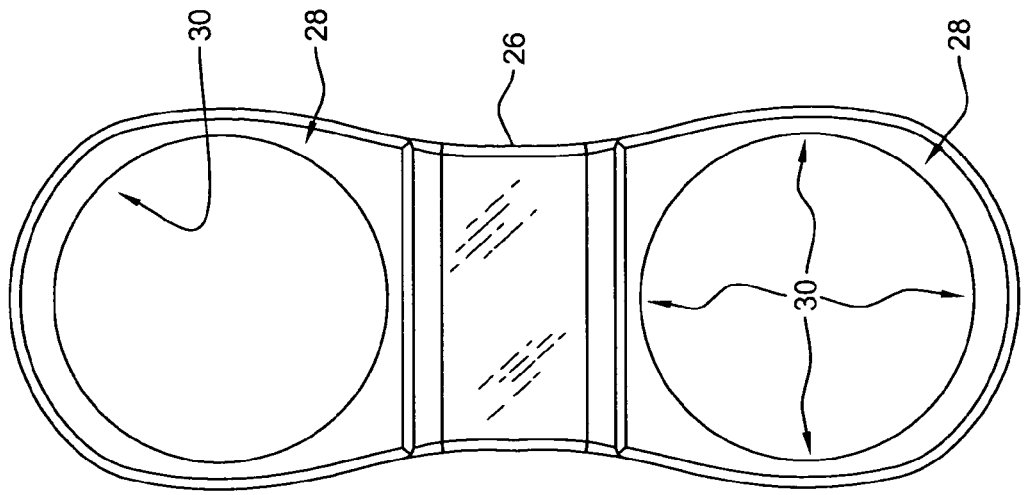
FIGS. 2A-D show views of a nonelastomeric outer drivelink member with a first linkend and a distal second linkend with linkend cavities.
Figure 2A:
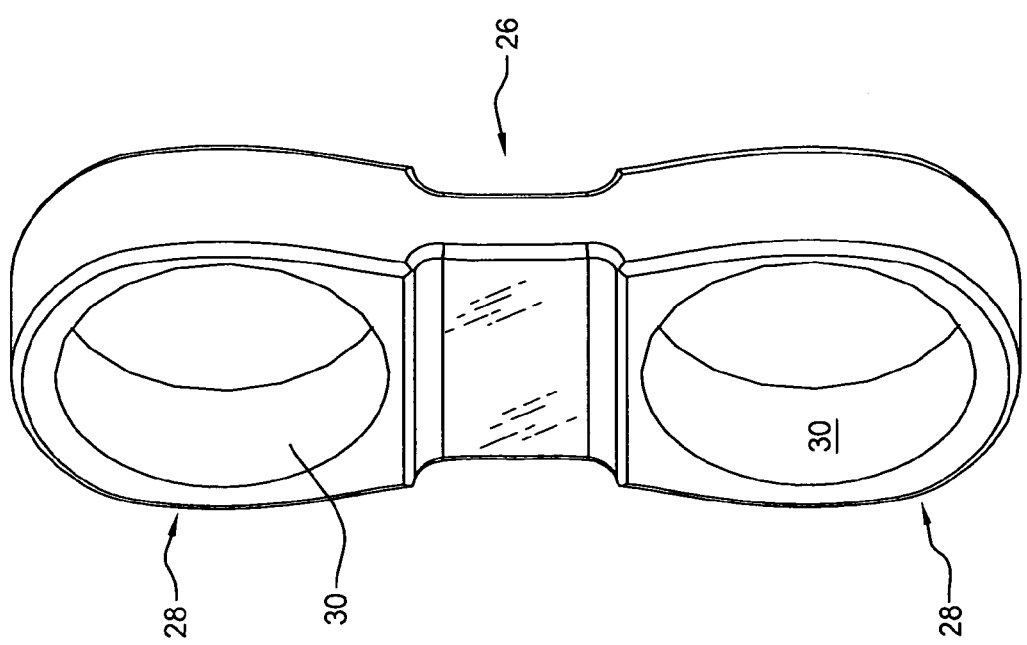
Figure 2D:
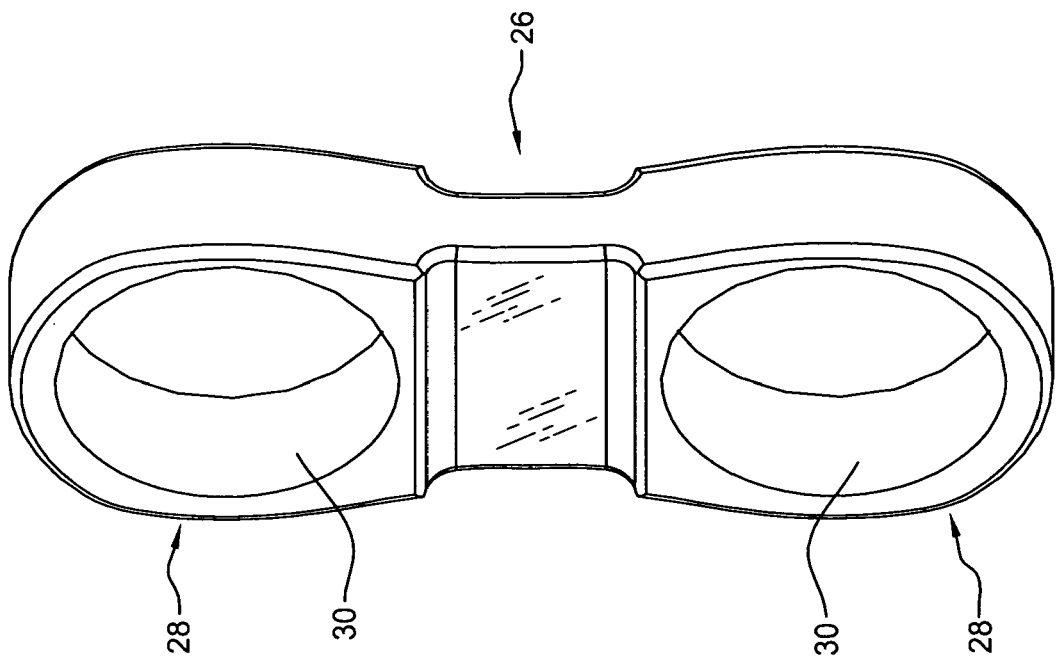
Figure 2C:
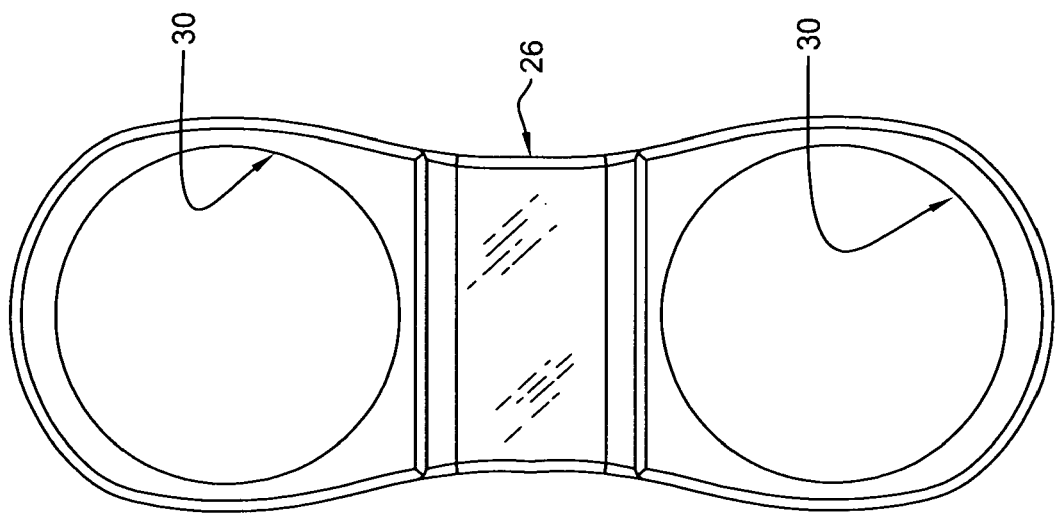
Figure 3B:
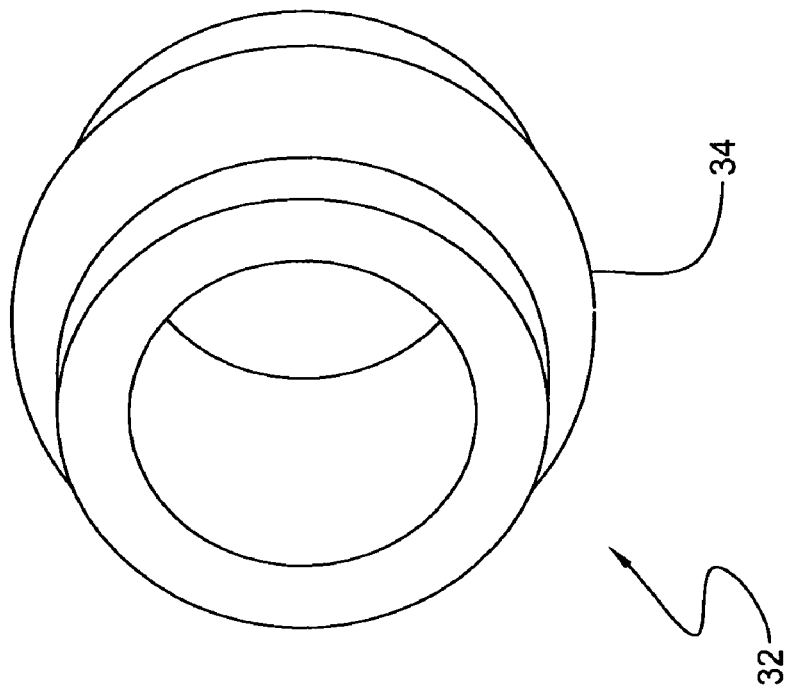
FIGS. 3A-D show views of a linkend nonelastomeric inner member.
Figure 3A:
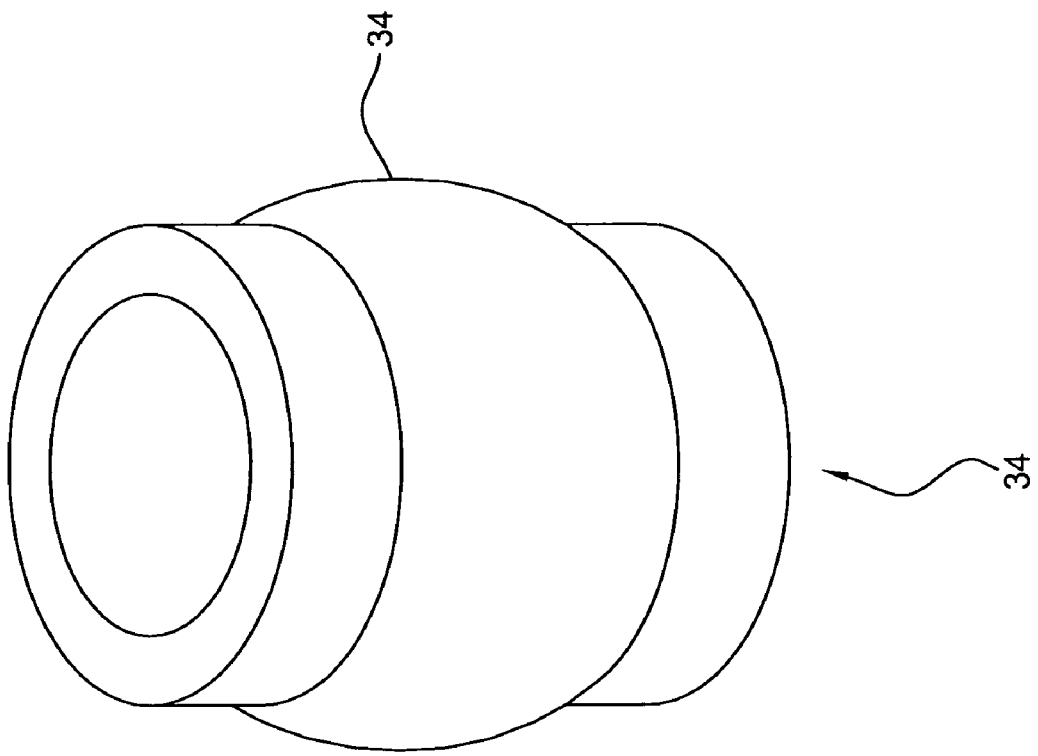
Figure 3D:
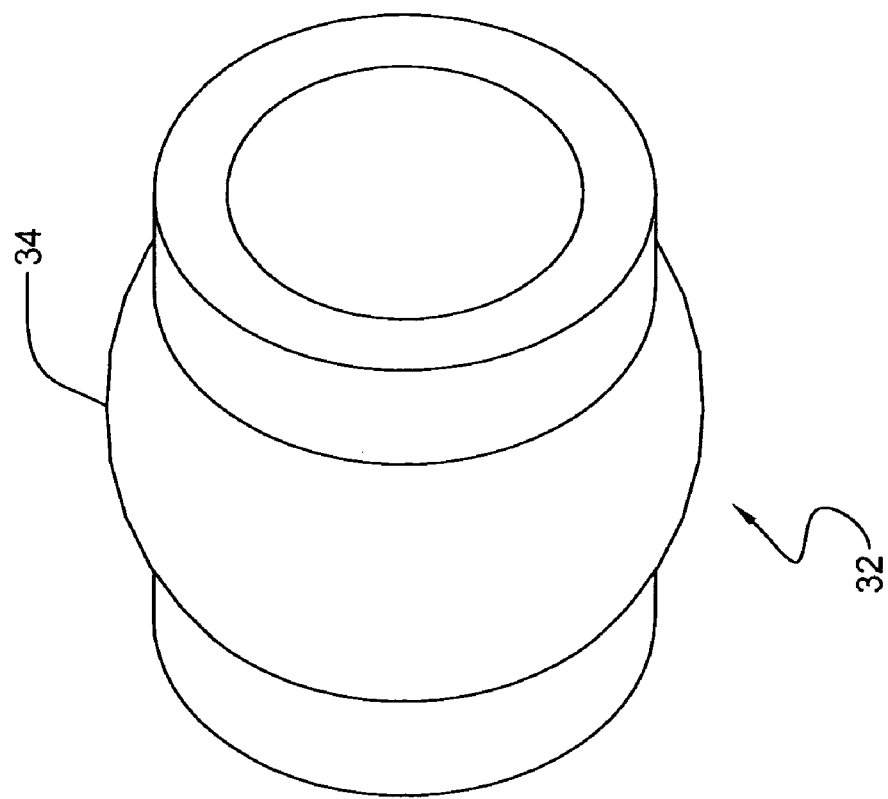
Figure 3C:
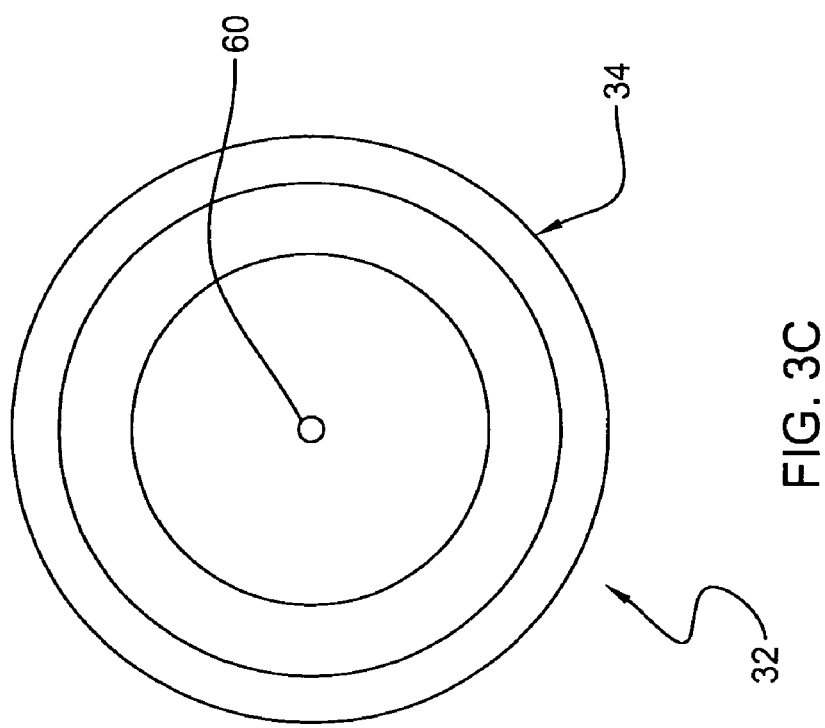
Figure 4D:
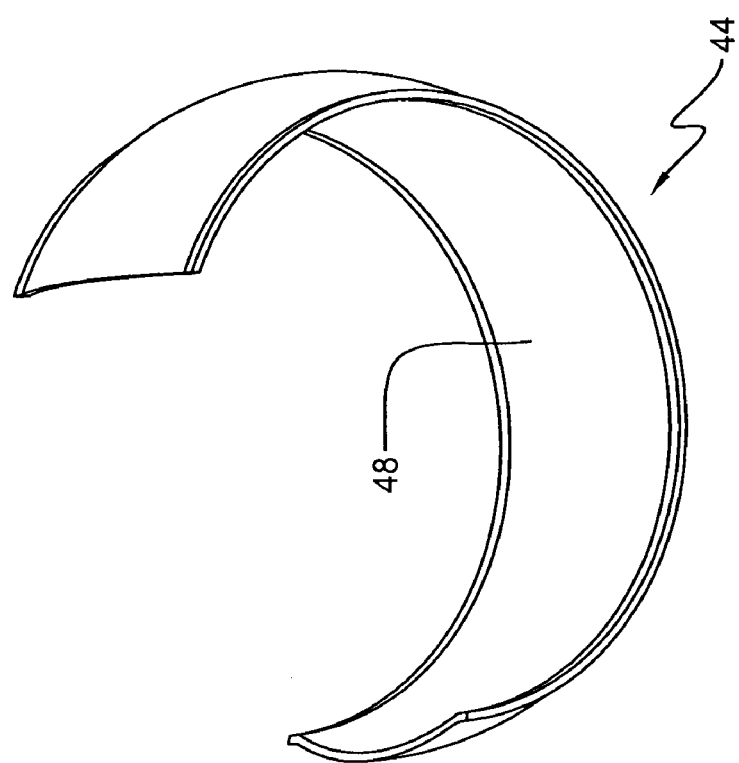
Figure 4C:
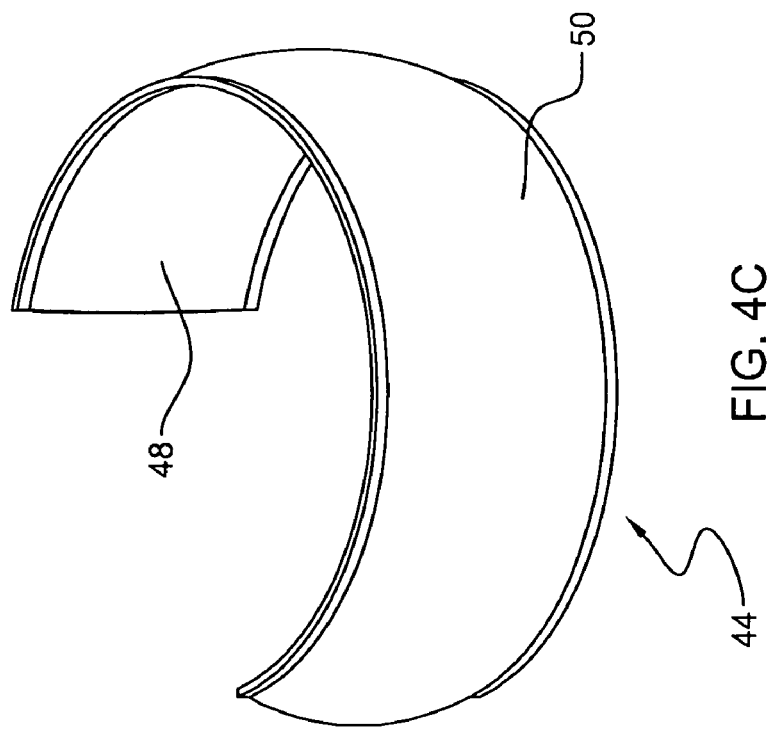
Figure 4E:
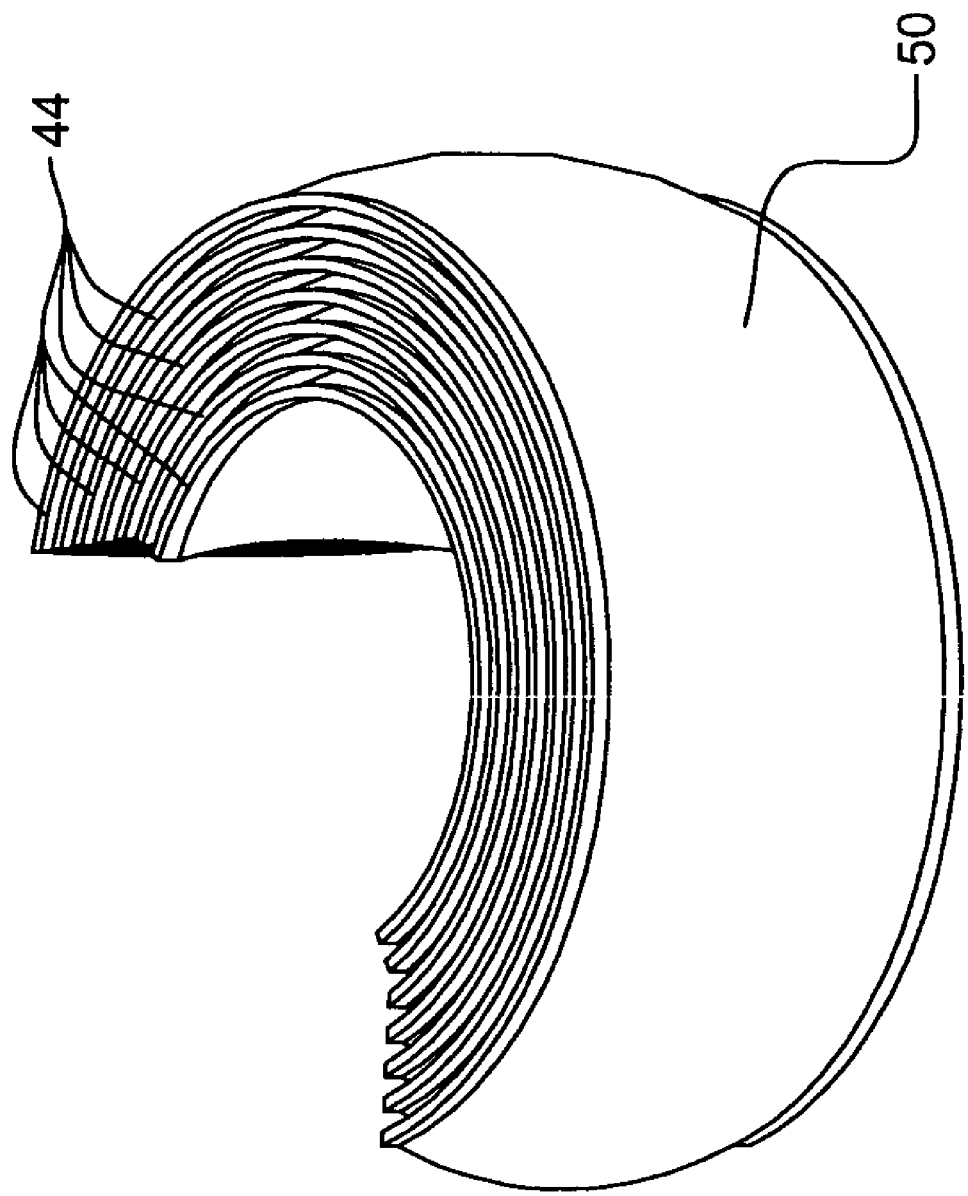
Figure 5B:
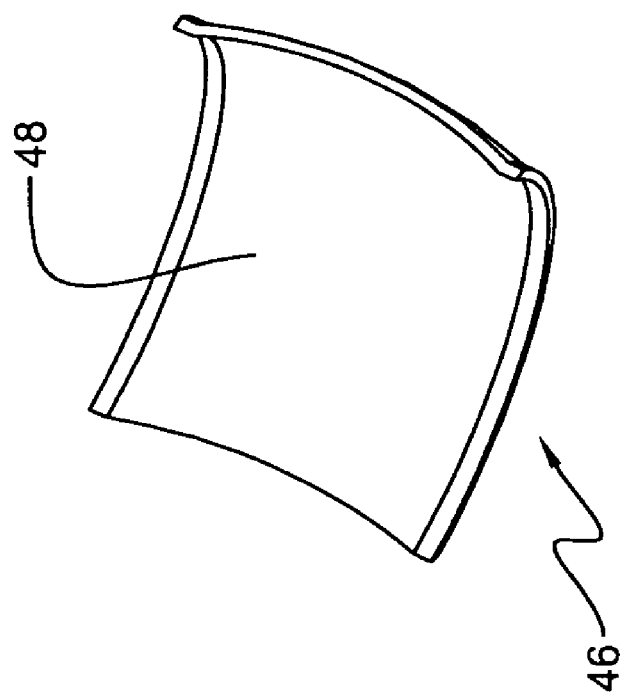
FIGS. 5A-D show views of nonelastomeric shims.
Figure 5A:
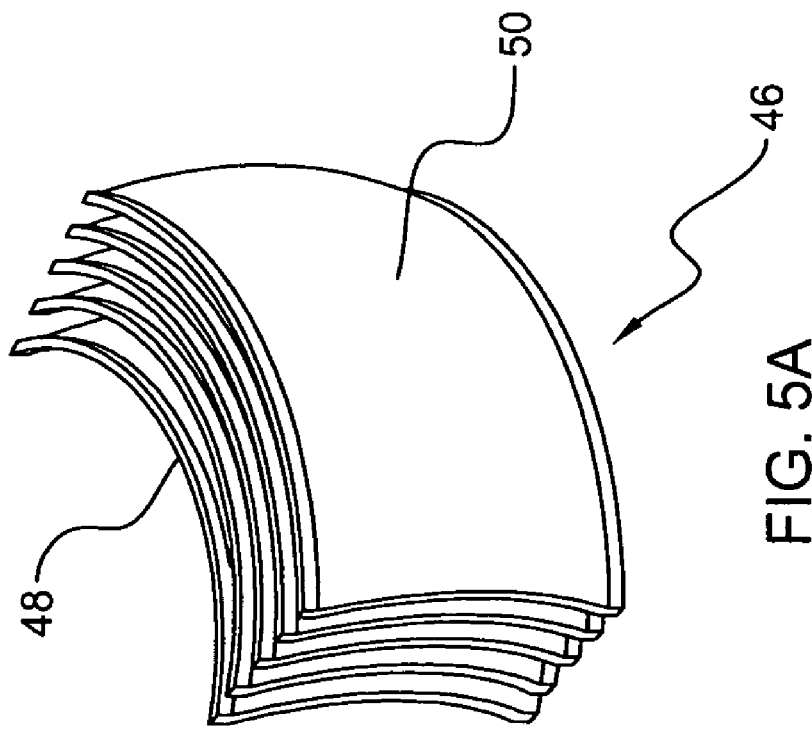
Figure 5D:
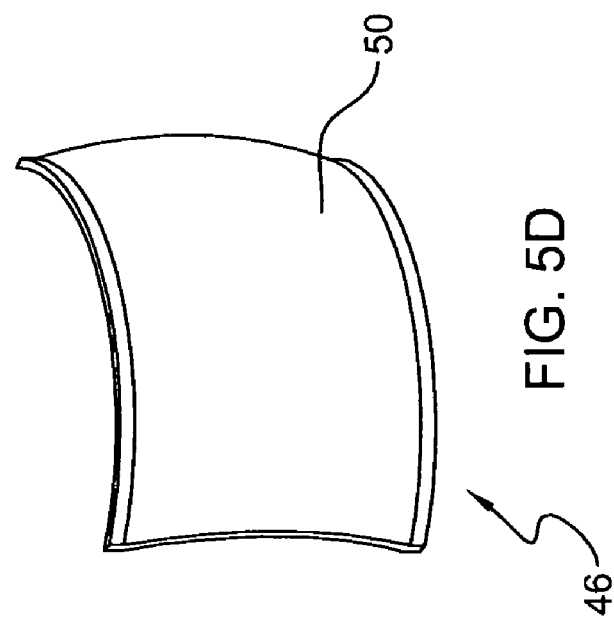
Figure 5C:
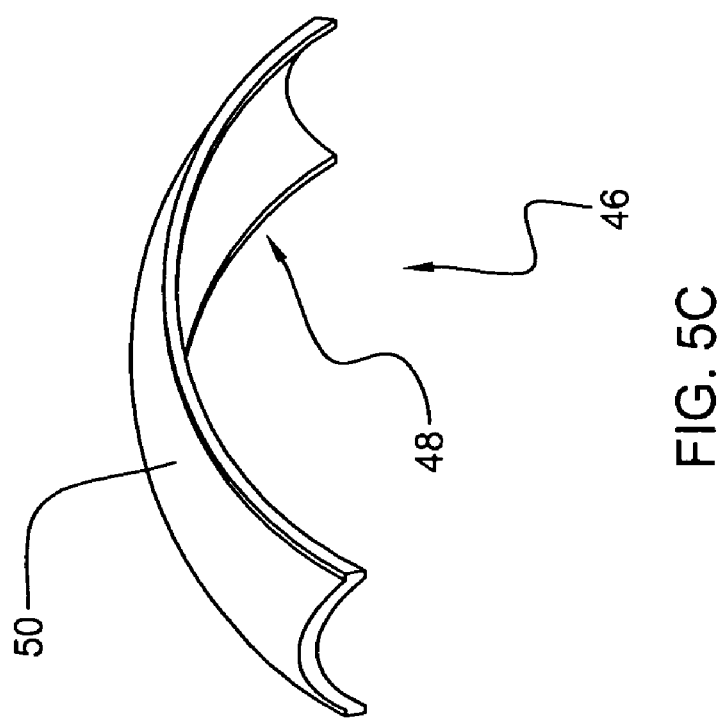
Figure 6D:
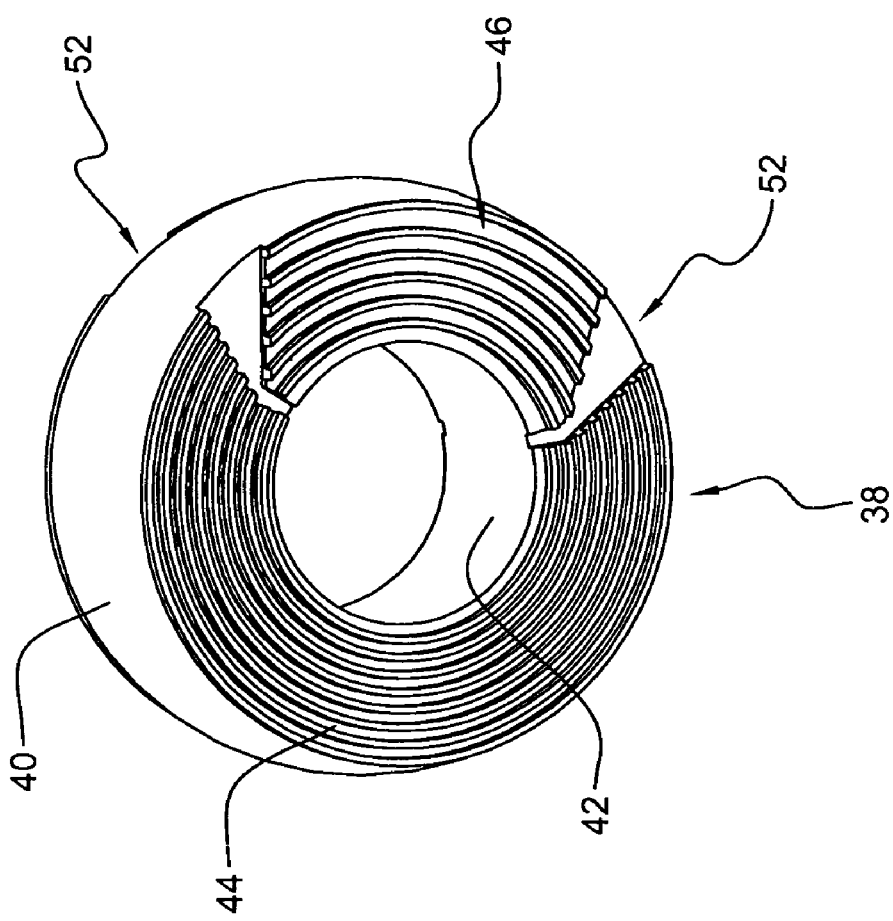
Figure 6C:
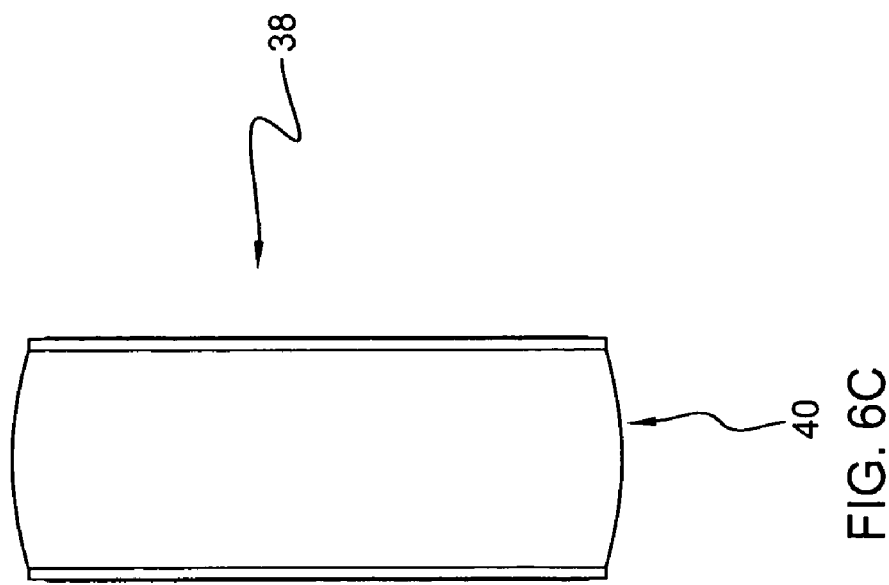
Figure 6F:
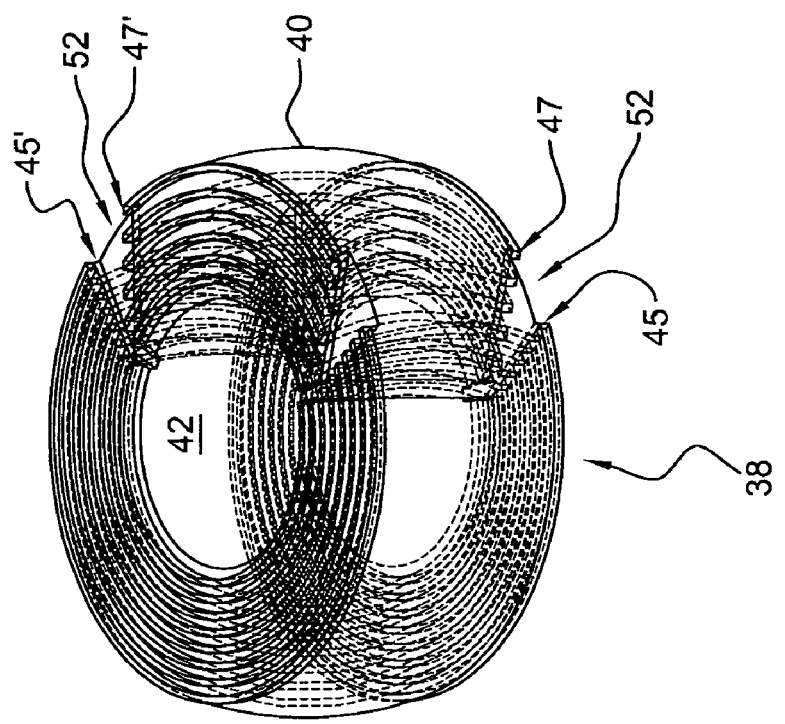
Figure 6E:
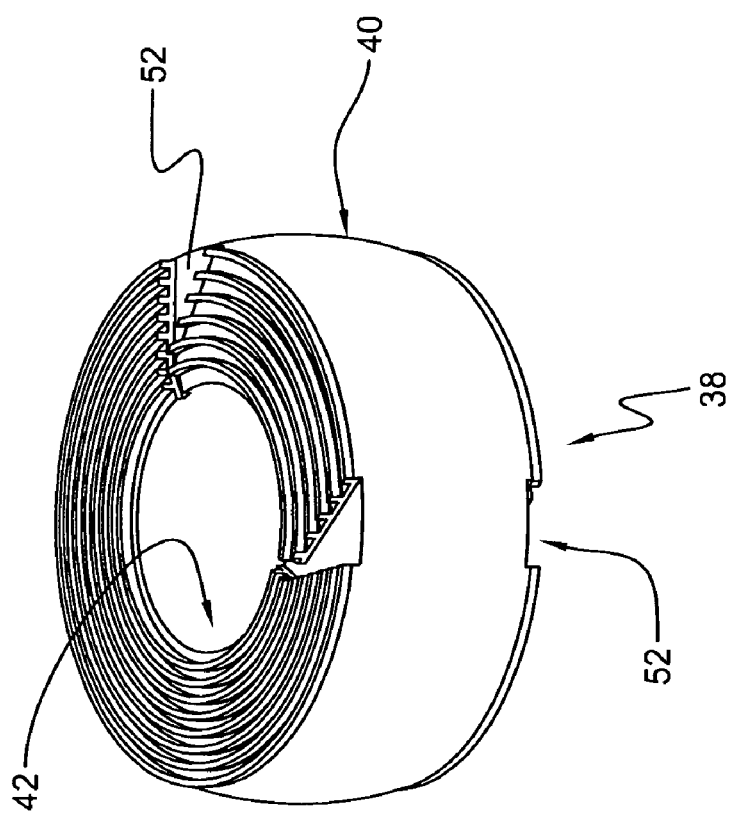
Figure 6H:
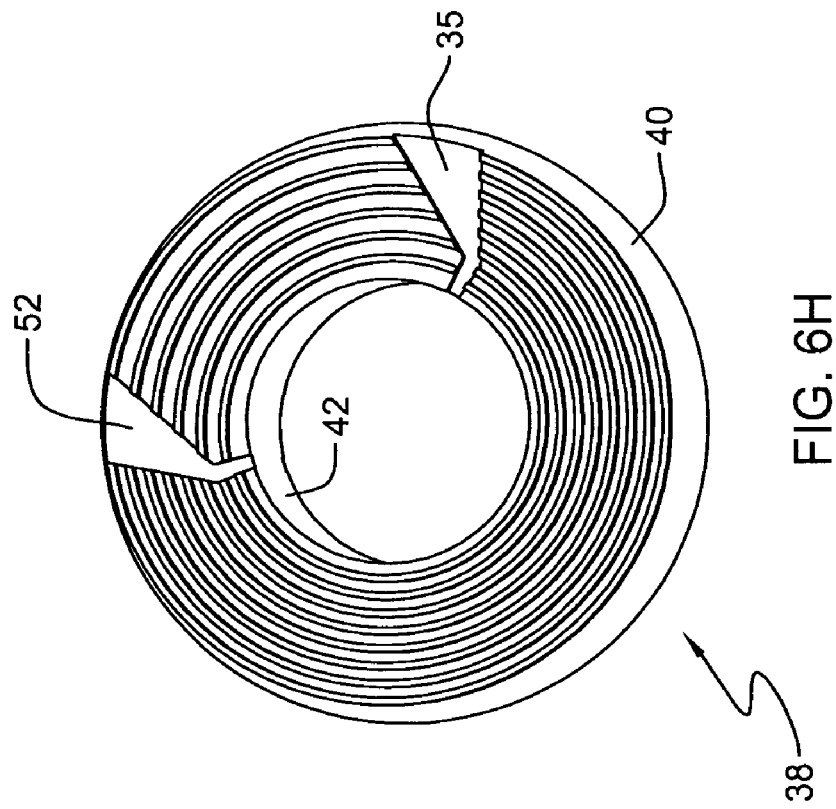
Figure 6G:
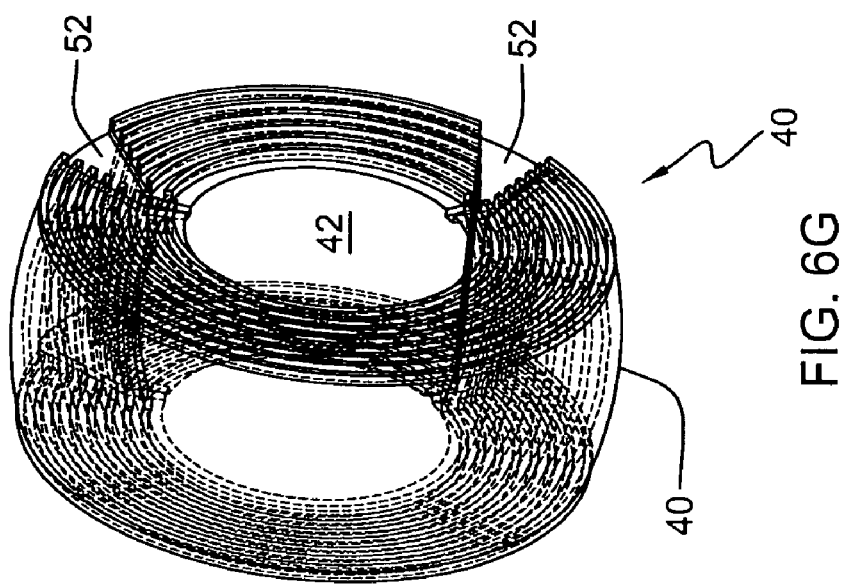
Figure 6J:
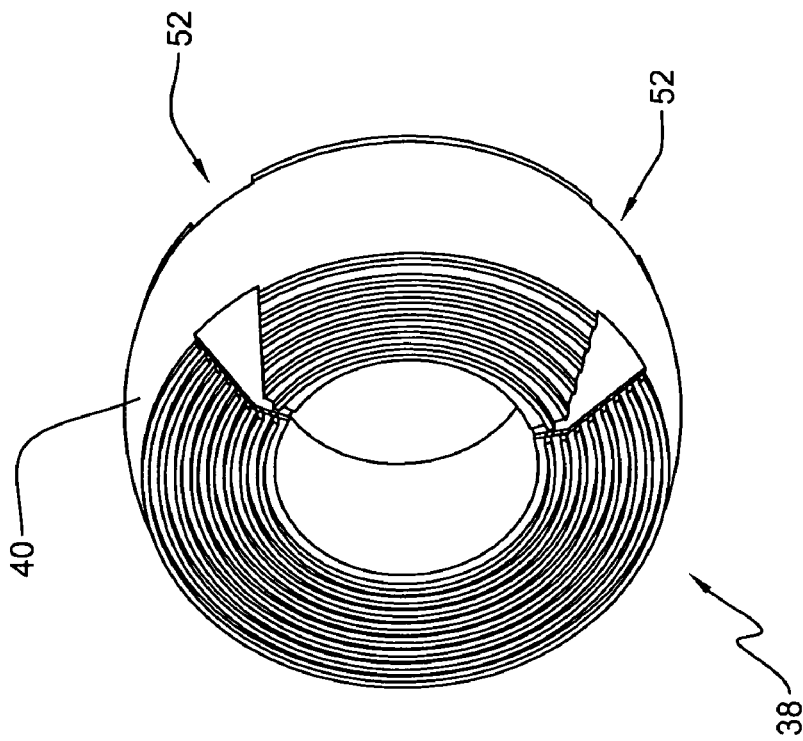
Figure 6I:
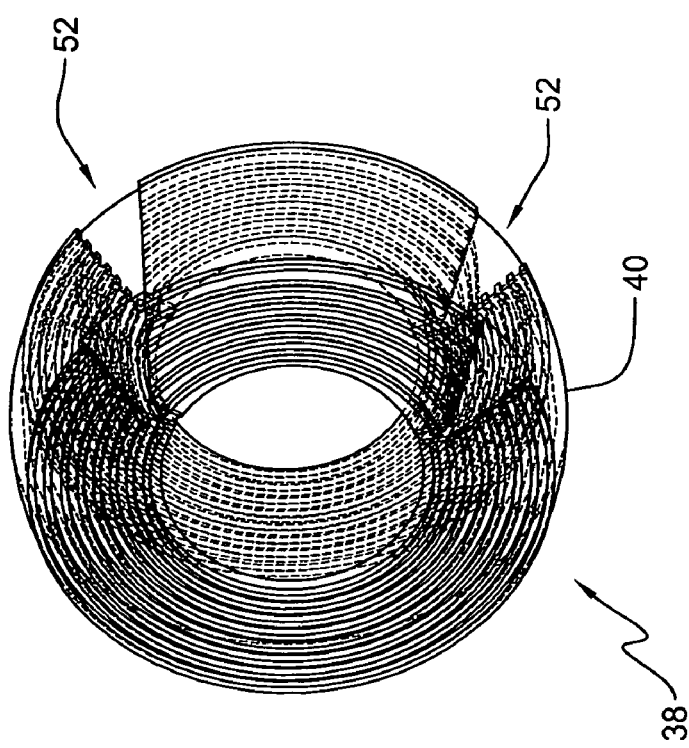
Figure 6K:
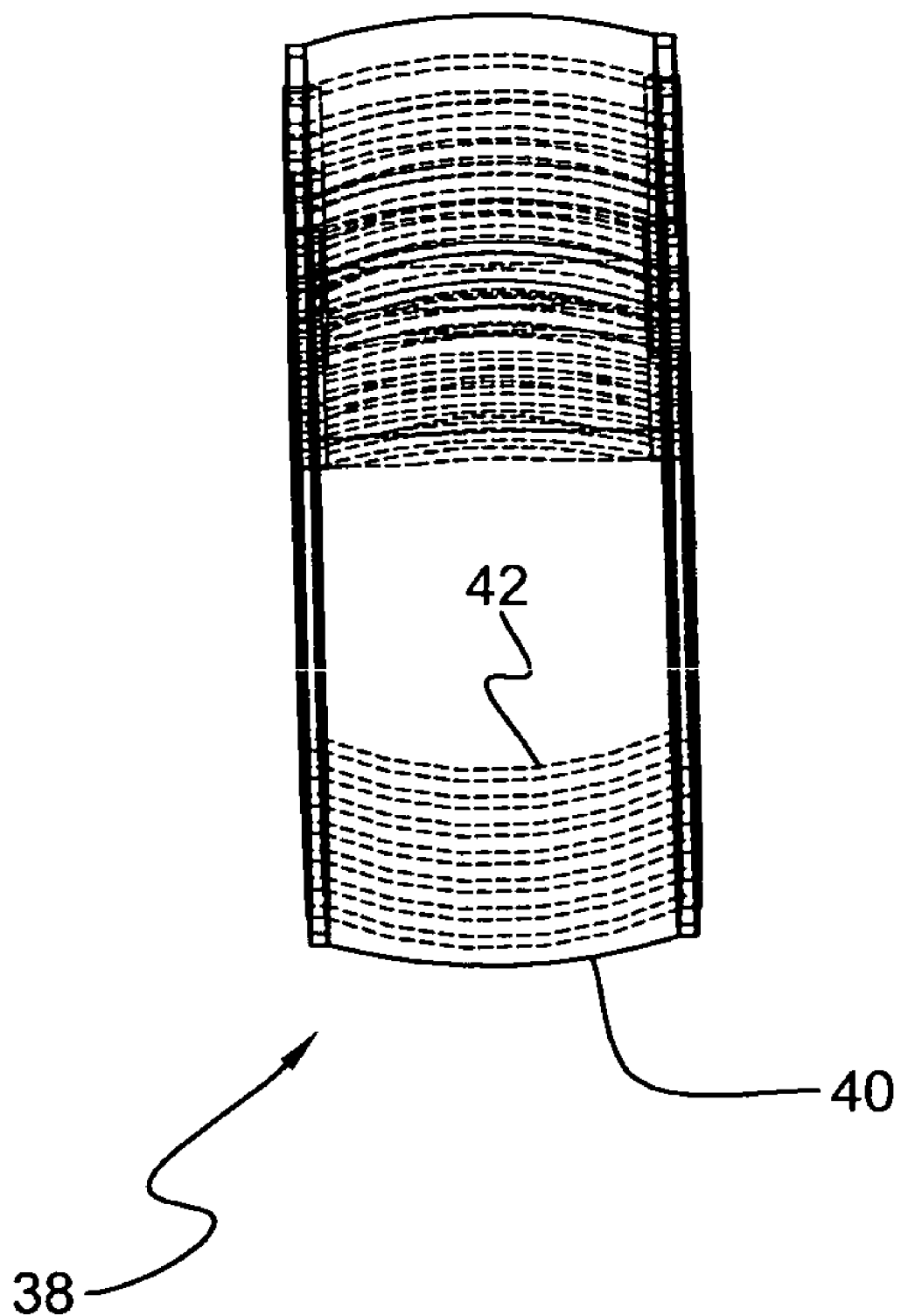
Figure 7A:
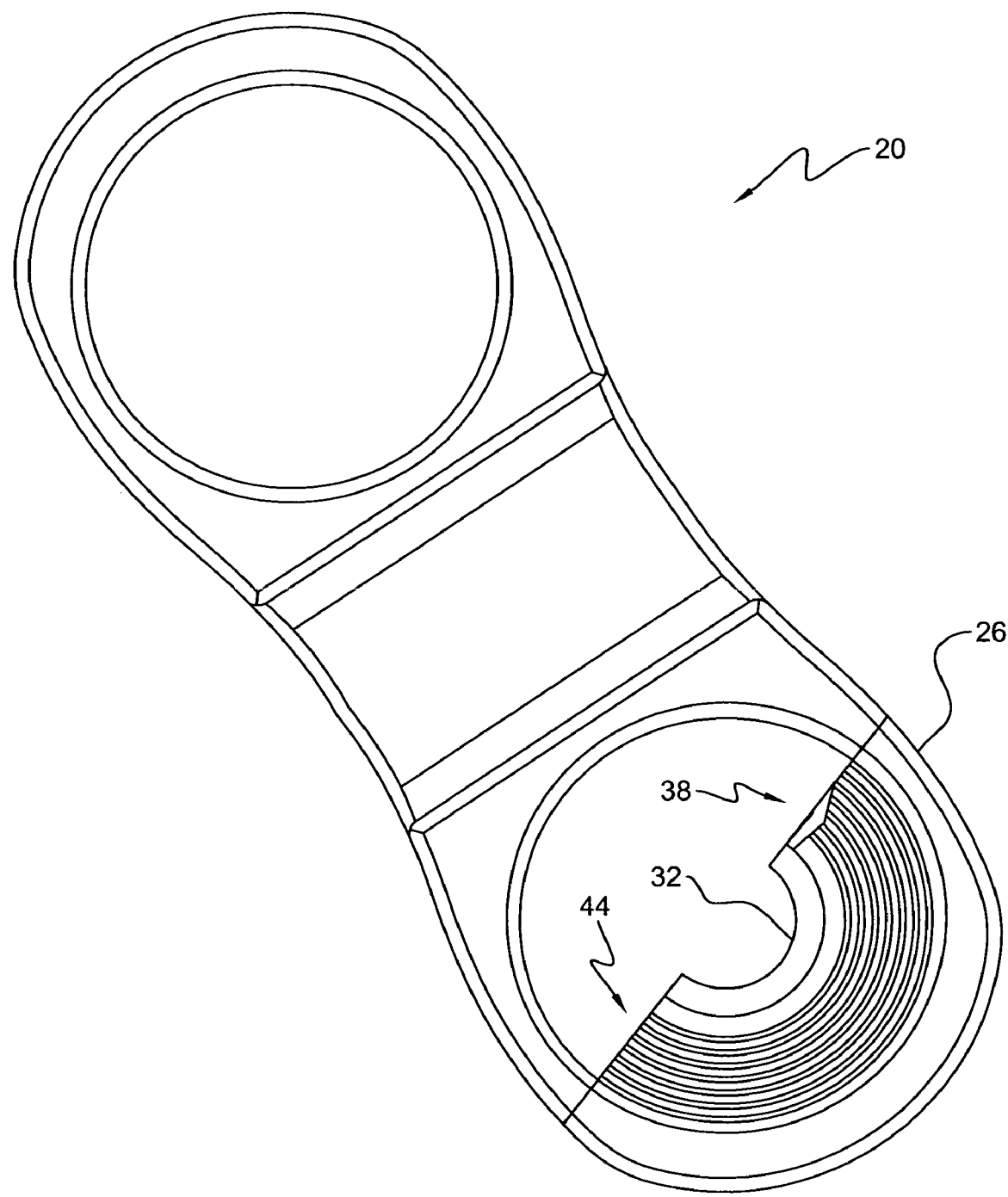
FIGS. 7A-E show views of the drivelink and linkend component members.
Figure 7B:
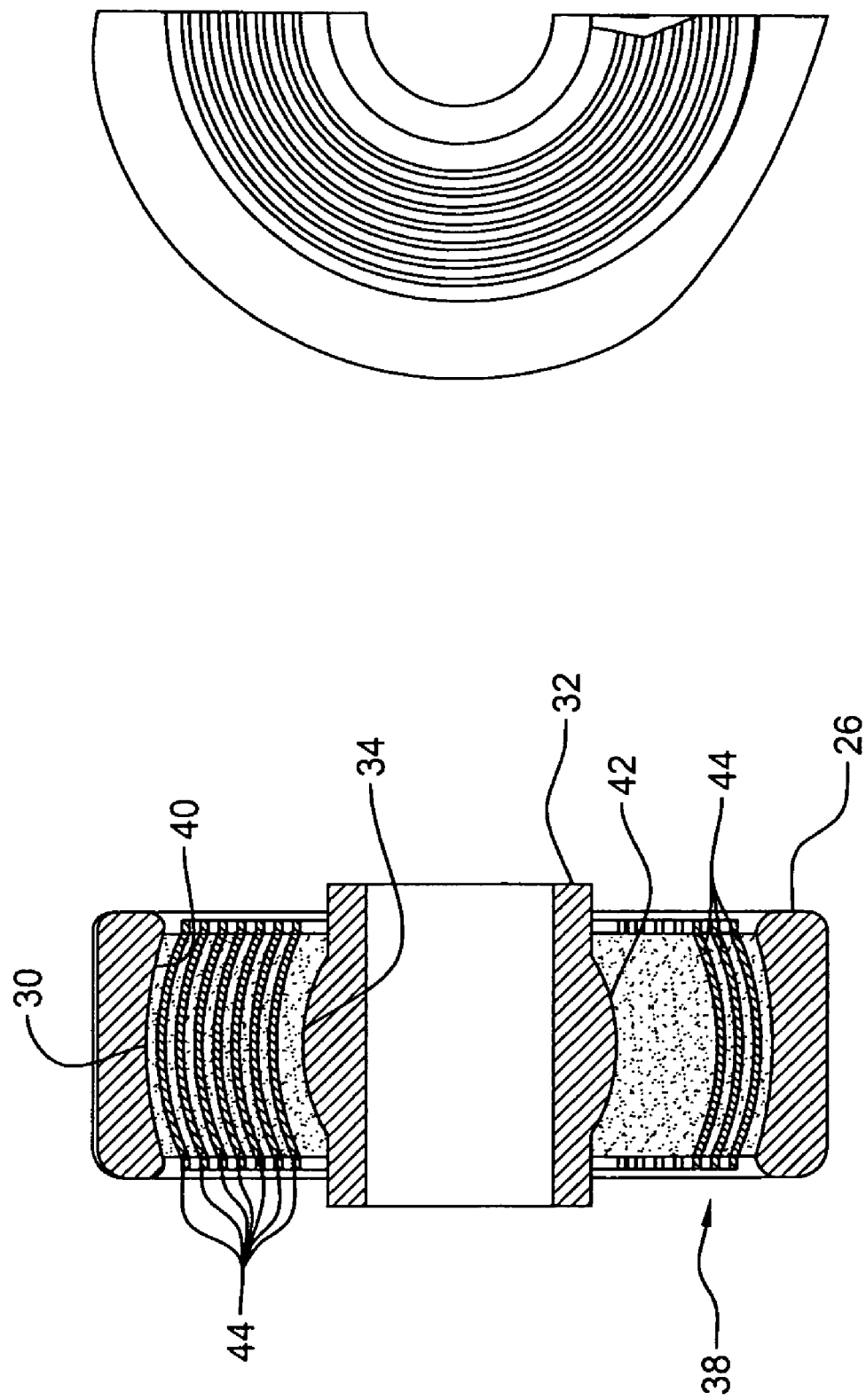
Figure 7C:
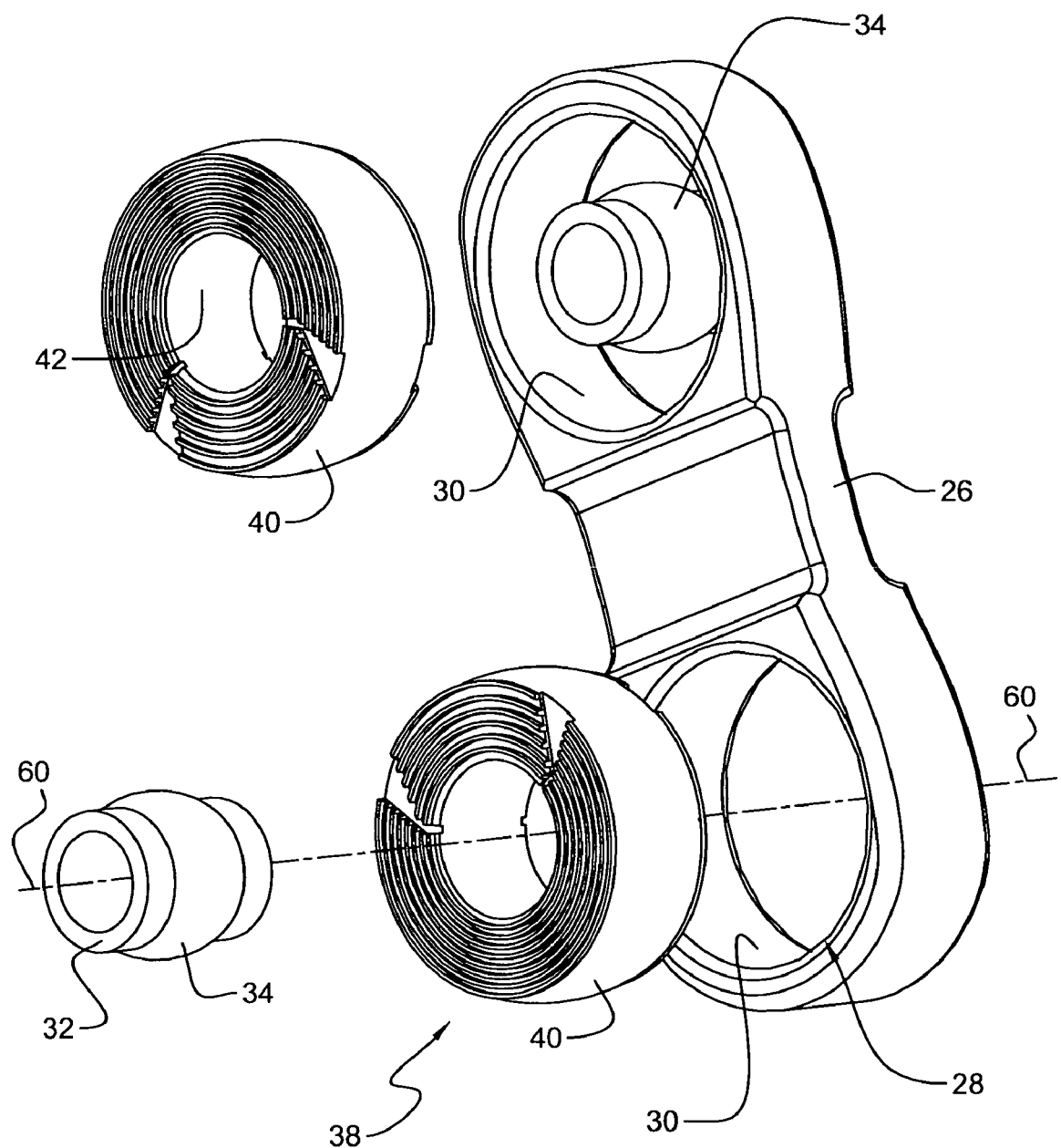
Figure 7D:
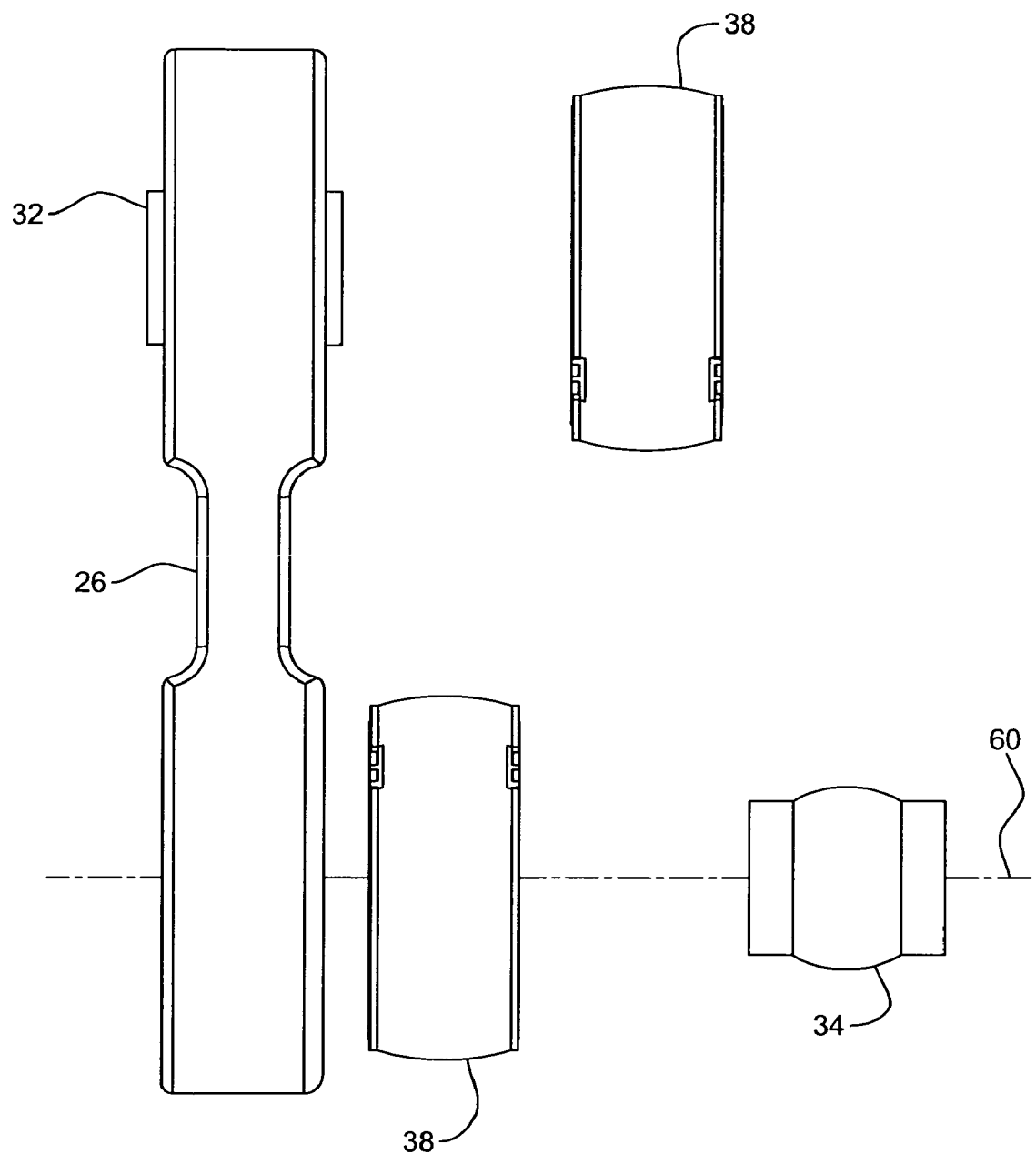
Figure 7E:
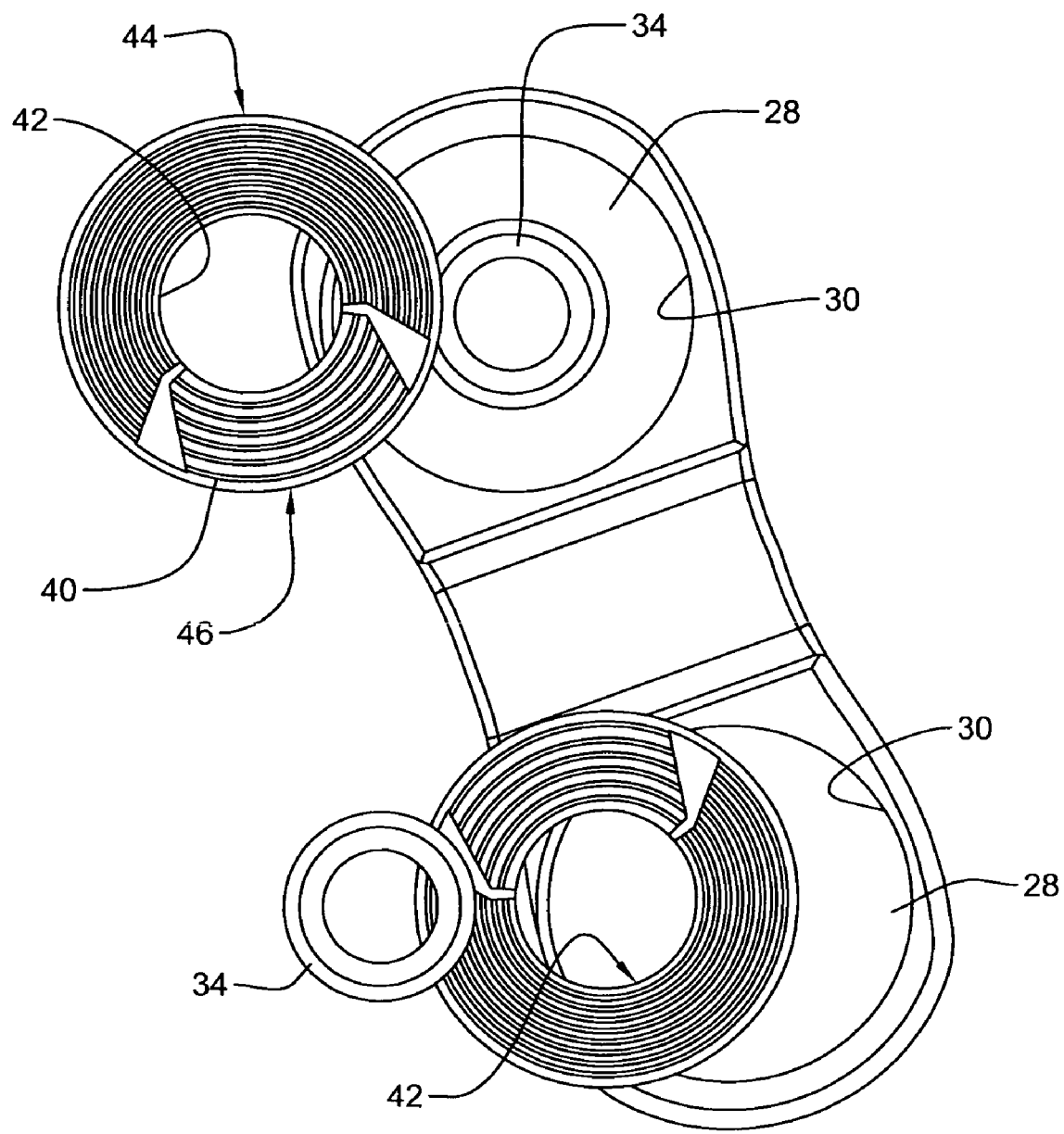
Figure 8A:
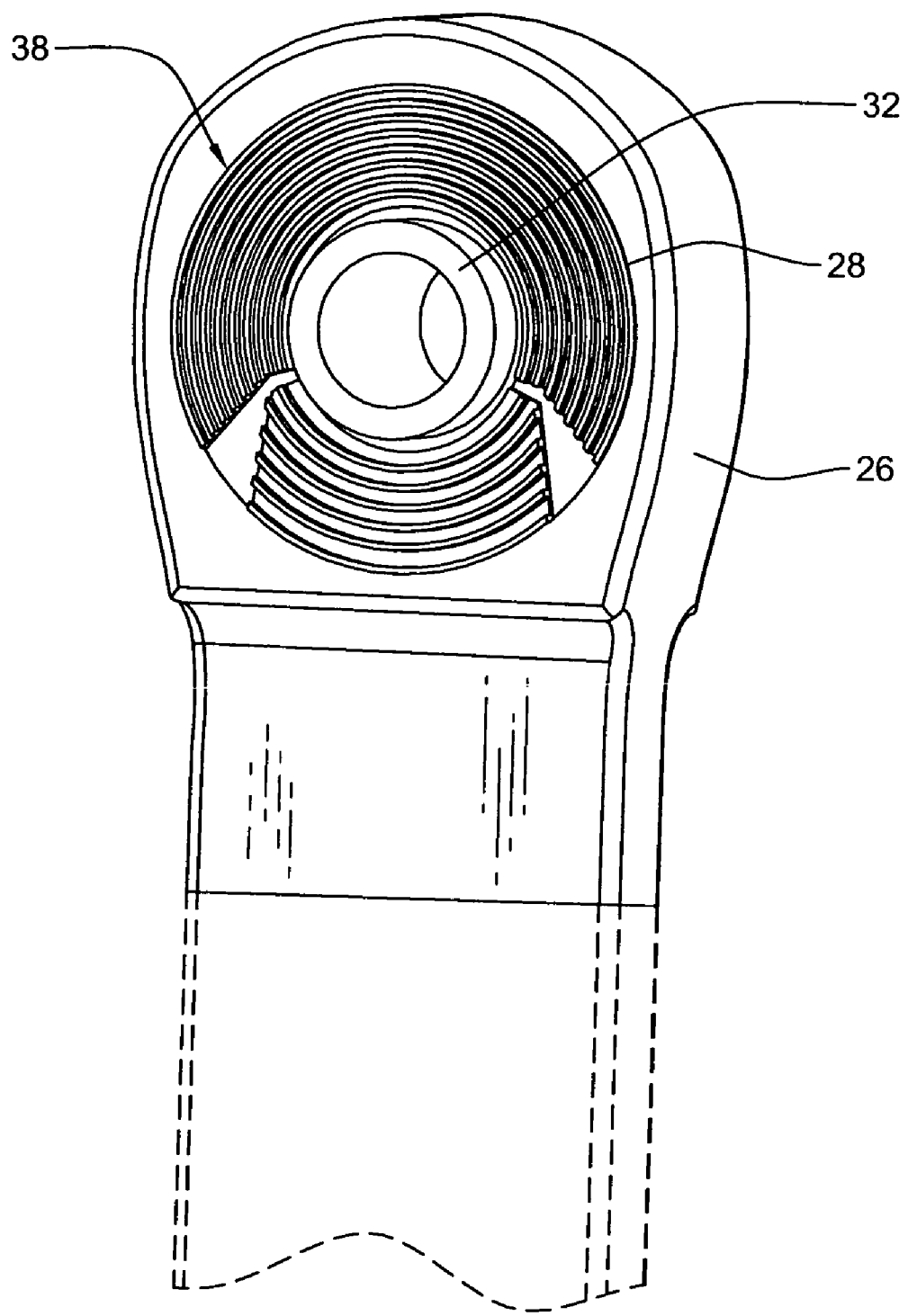
FIGS. 8A-C show views of a linkend.
Figure 8B:
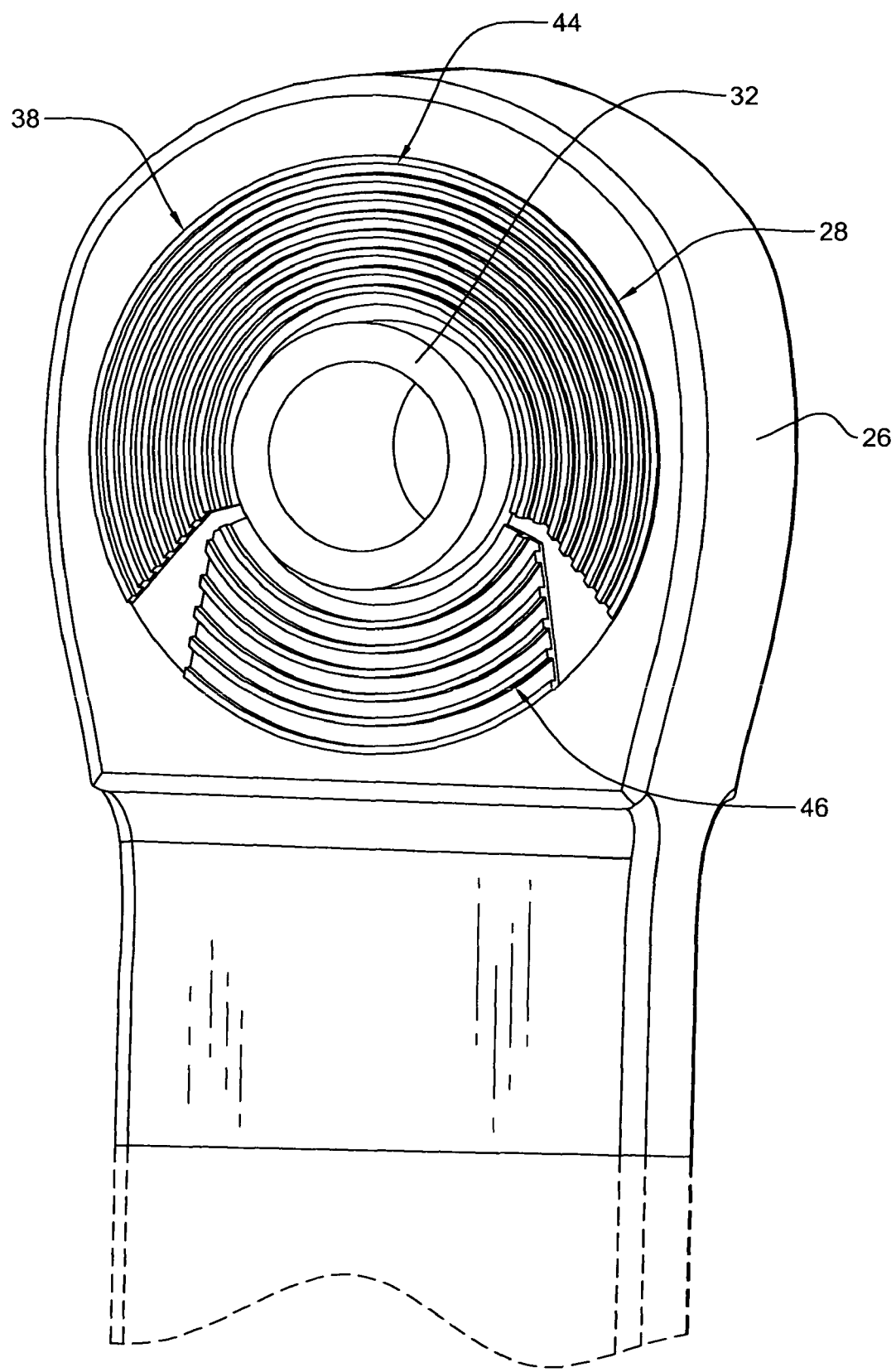
Figure 8C:
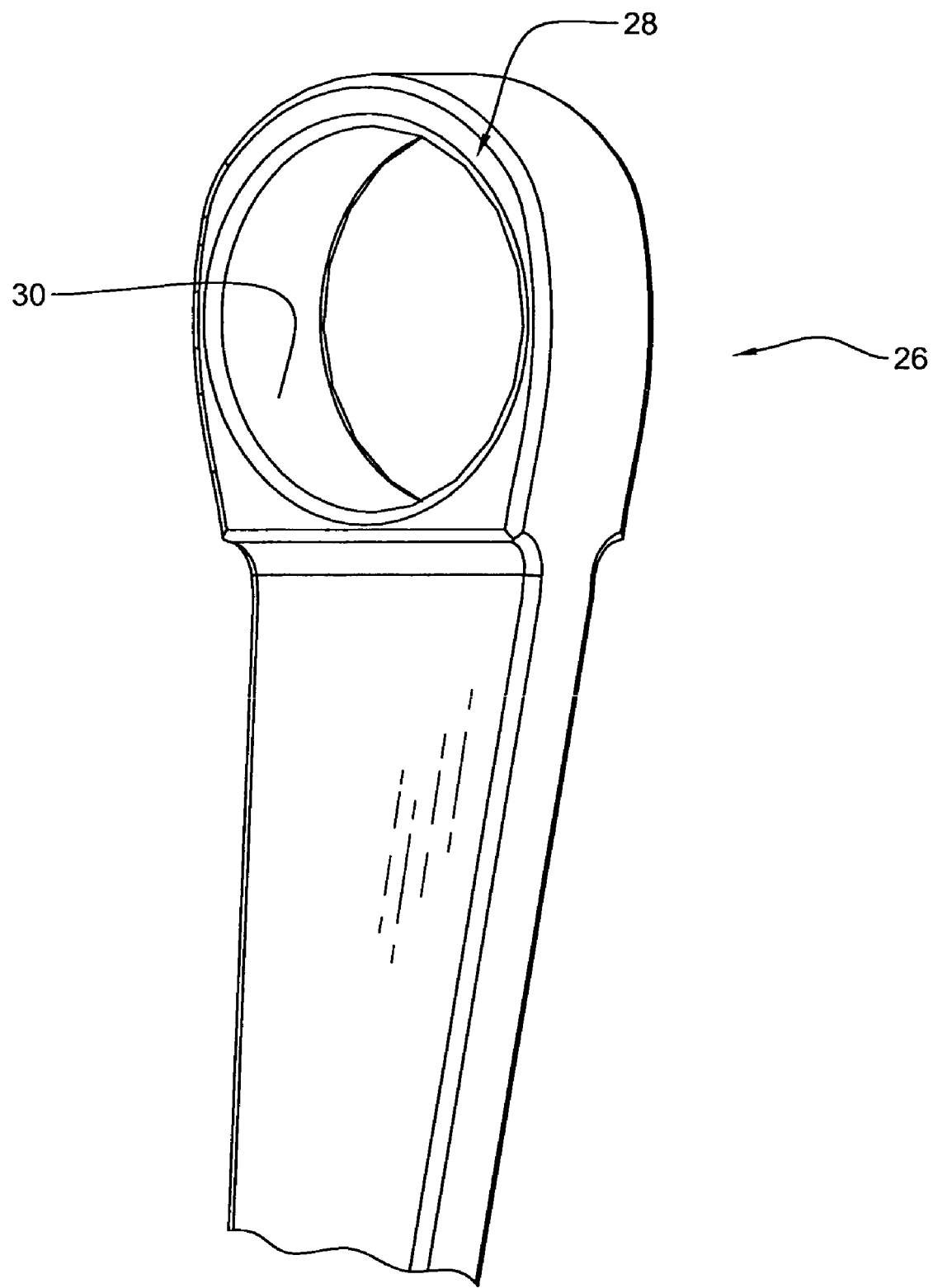
Figure 9:
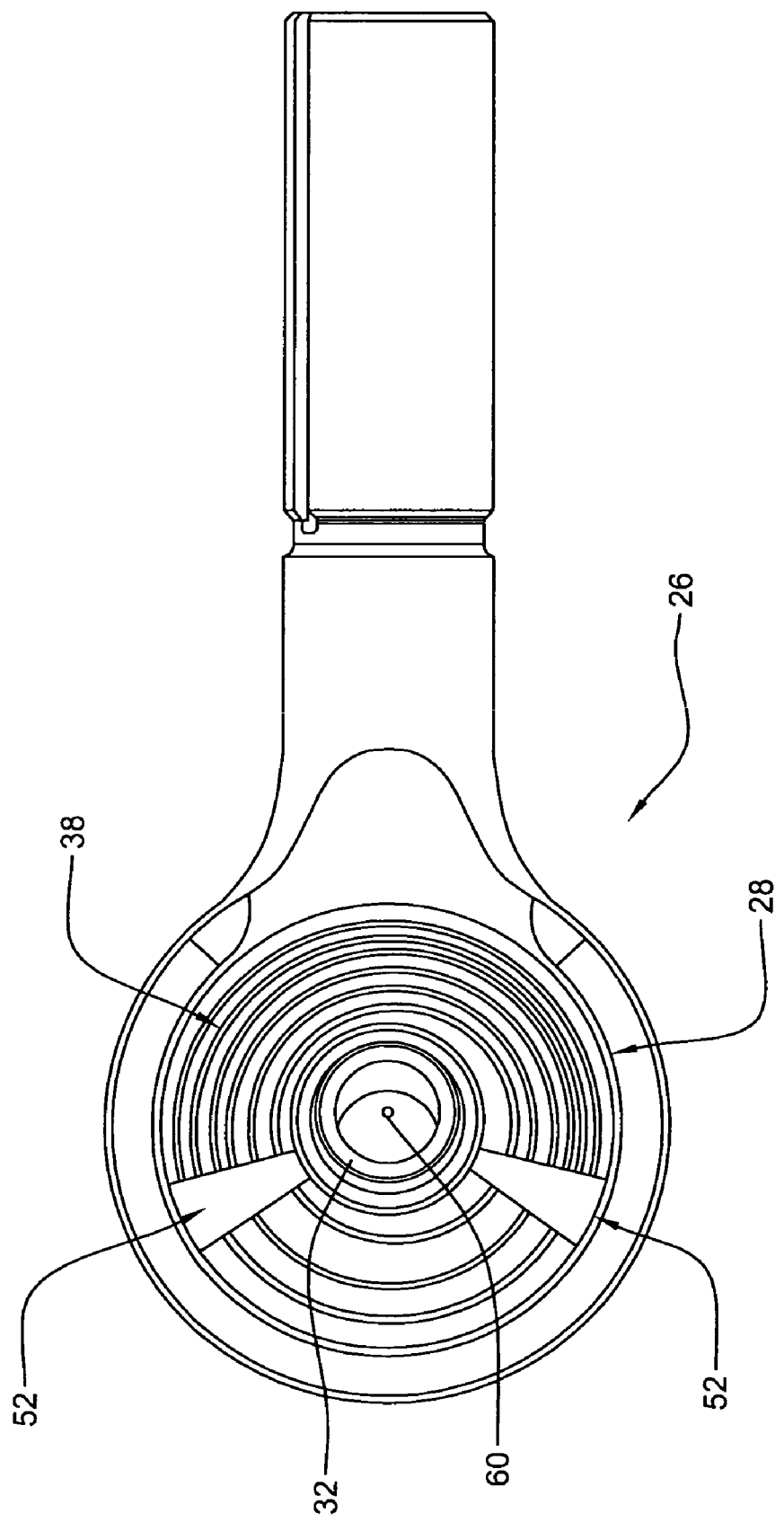
FIG. 9 shows a view of a linkend.
Figure 10:
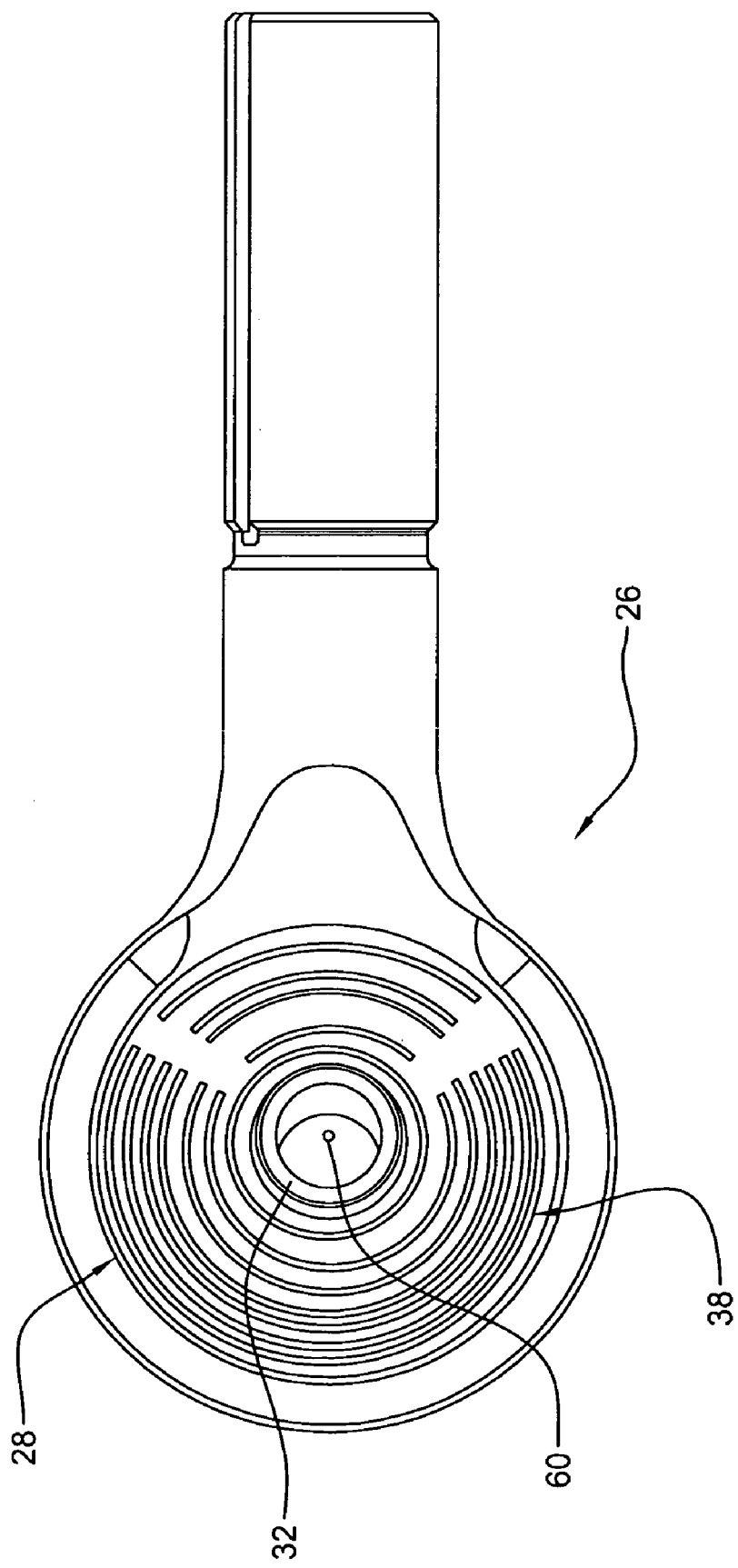
FIG. 10 shows a view of a linkend.
Figure 11:
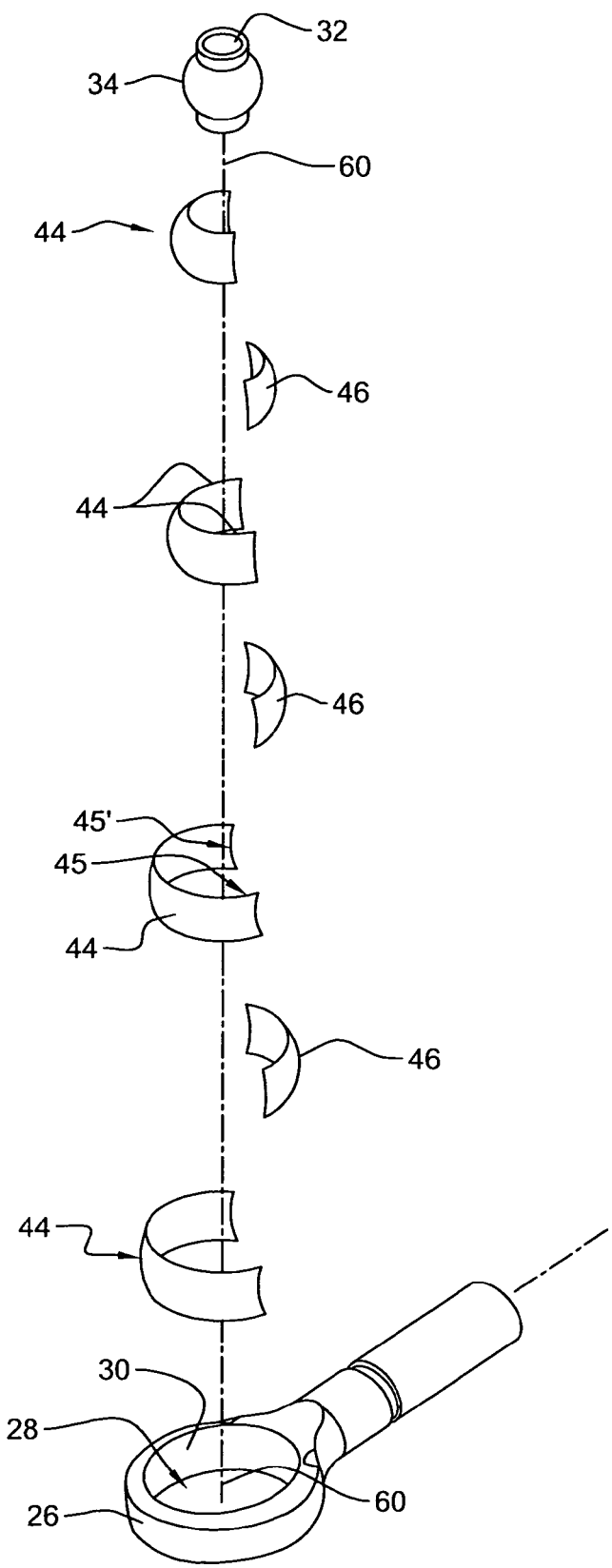
FIG. 11 shows an exploded view of a linkend.
Figure 12:
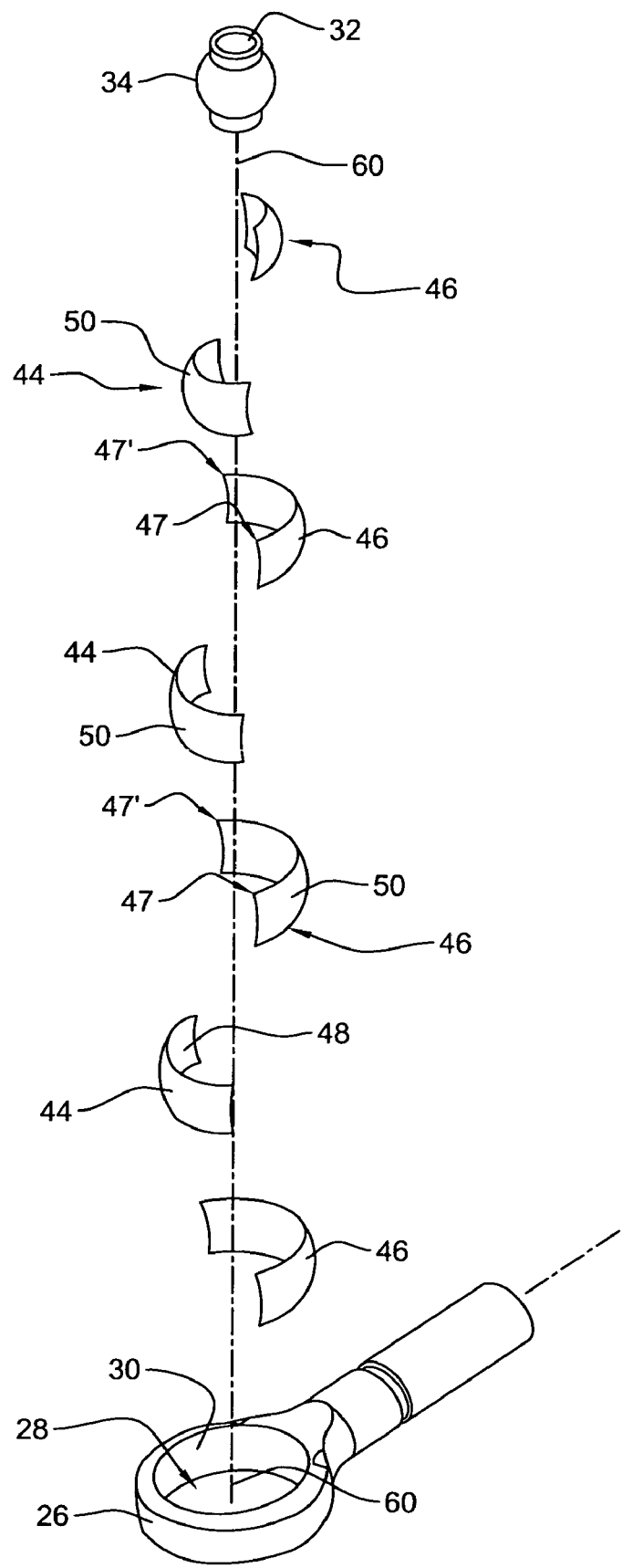
FIG. 12 shows an exploded view of a linkend.
Figure 13:
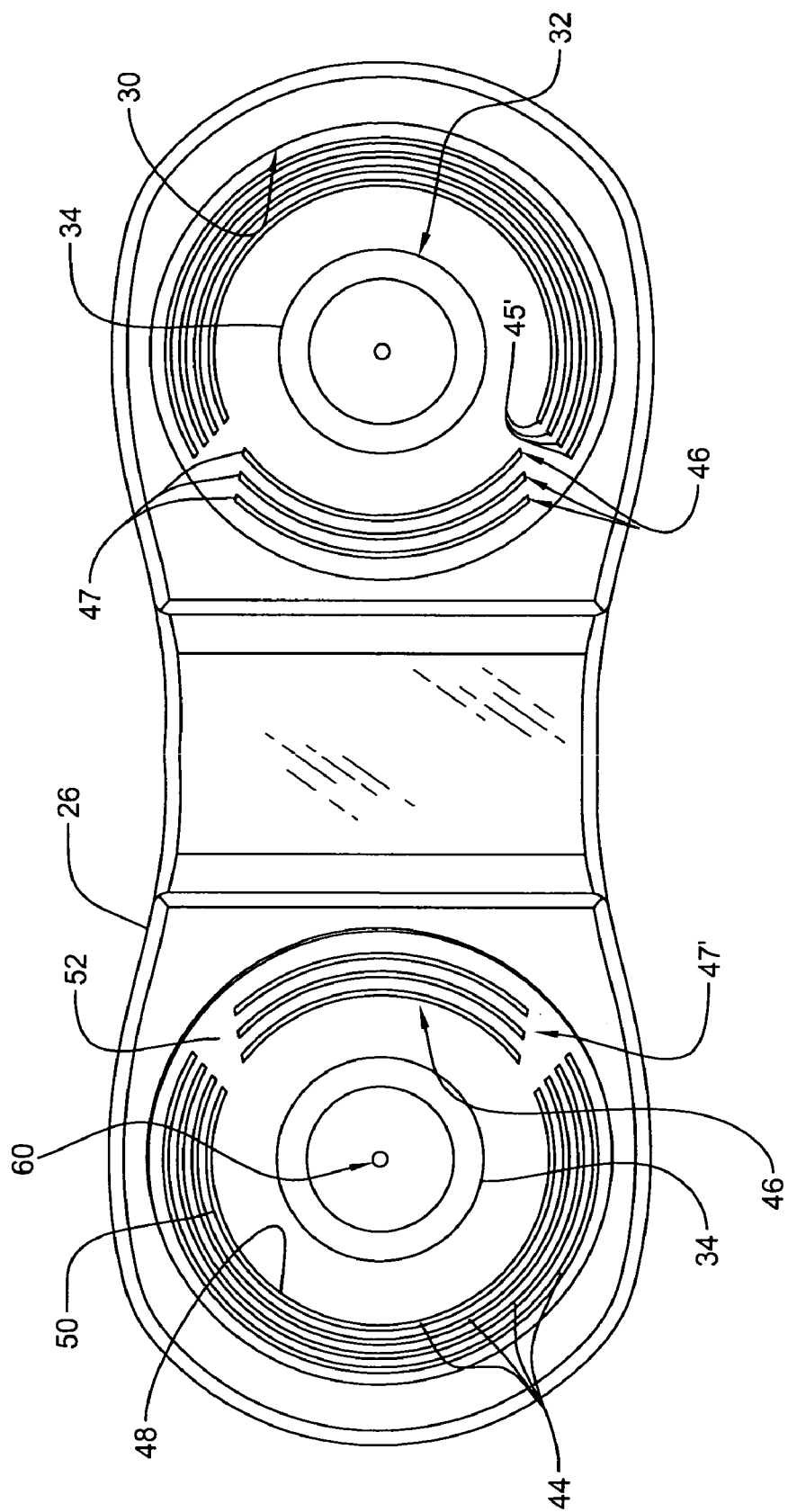
FIG. 13 shows a view of a drivelink.

In an embodiment the invention includes a tiltrotor aircraft drivelink 20 as shown in FIGS. 1-7 and 13. The tiltrotor aircraft drivelink 20 includes a nonelastomeric outer drivelink member 26 with a first linkend 22 and a distal second linkend 24 as shown in FIGS. 1-2,7, and 13. The tiltrotor aircraft drivelink first linkend 22 has a first linkend cavity 28 with a first linkend cavity inner circumferential bonding surface 30. The linkend 22 includes a first linkend nonelastomeric inner member 32 contained in the first linkend cavity 28, the first linkend nonelastomeric inner member 32 preferably having a first linkend outer circumferential bonding surface 34 as shown in FIGS. 1, 3, 7, and 13. The linkend 22 includes a first linkend elastomeric intermediate 38 having an outer circumferential elastomeric bonding surface 40 and an inner circumferential elastomeric bonding surface 42 with the outer circumferential elastomeric bonding surface 40 bonded to the first linkend cavity inner circumferential bonding surface 30 and the inner circumferential elastomeric bonding surface 42 bonded to the first linkend outer circumferential bonding surface 34 as shown in FIGS. 1, 6, 7, and 13. The elastomeric intermediate 38 preferably contains N (preferably N is a whole number $\geq 2$) nonelastomeric first side outboard bonded shims 44 and no more than N-1 nonelastomeric second side inboard bonded shims 46 as shown in FIGS. 1, 7, and 13. Preferably the tiltrotor aircraft drivelink second linkend 24 has a second linkend cavity 28 with a second linkend cavity inner circumferential bonding surface 30, and a second linkend nonelastomeric inner member 32 contained in the second linkend cavity 28, with the second linkend nonelastomeric inner member 32 having a second linkend outer circumferential bonding surface 34, and a second linkend elastomeric intermediate 38 having an outer circumferential elastomeric bonding surface 40 and an inner circumferential elastomeric bonding surface 42, the outer circumferential elastomeric bonding surface 40 bonded to the second linkend cavity inner circumferential bonding surface 30 and the inner circumferential elastomeric bonding surface 42 bonded to the second linkend outer circumferential bonding surface 34 as shown in FIGS. 1-2, 7, and 13. Preferably the second elastomeric intermediate contains N nonelastomeric outboard bonded shims 44 and no more than N-1 nonelastomeric inboard bonded shims 46.

In an embodiment the invention includes a tiltrotor aircraft drivelink 20. Preferably the tiltrotor aircraft drivelink 20 includes a nonelastomeric rigid longitudinally extending outer drivelink member 26 with a first linkend 22 and a distal second linkend 24. The tiltrotor aircraft drivelink first linkend 22 has a first linkend cavity 28 with a first linkend cavity inner circumferential bonding surface 30. The linkend includes a first linkend nonelastomeric inner member 32 contained in the first linkend cavity 28, with the first linkend nonelastomeric inner member 32 having a first linkend outer circumferential bonding surface 34. The linkend includes a first linkend elastomeric intermediate 38 having an outer circumferential elastomeric bonding surface 40 and an inner circumferential elastomeric bonding surface 42, the outer circumferential elastomeric bonding surface 40 mold bonded to the first linkend cavity inner circumferential bonding surface 30 and the inner circumferential elastomeric bonding surface 42 mold bonded to the first linkend outer circumferential bonding surface 34. The linkend elastomeric intermediate 38 preferably contains N (N is preferably a whole number preferably $\geq 2$) nonelastomeric metal outboard bonded shims 44, with shims 44 preferably encased in the elastomer of the intermediate 38 with both the inner surface 48 and the outer surfaces 50 of the shims are bonded to the elastomer of elastomeric intermediate 38, preferably with the shims molded bonded to the elastomer in a mold bonding the elastomer bonding surface 40 and 42 to the nonelastomer bonding surfaces 30 and 34. The linkend elastomeric intermediate 38 preferably contains no more than N-1 nonelastomeric metal inboard bonded shims 46, with shims 46 preferably encased in the elastomer of the intermediate 38 with both the inner surface 48 and the outer surfaces 50 of the shims bonded to the elastomer of elastomeric intermediate 38, preferably with the shims molded bonded to the elastomer in a mold while bonding the elastomer bonding surface 40 and 42 to the nonelastomer bonding surfaces 30 and 34 and the shims 44 in the elastomer. Preferably the shims 44 and 46 are encased in the elastomer 38 with both inner surfaces 48 and outer surfaces 50 of the nonelastomeric shims bonded to the elastomer, preferably mold bonded to the elastomer of intermediate 38 in a mold while the elastomer intermediate is bonding in the mold with the inner member 32 and the outer member 26. Preferably the linkend elastomeric intermediate 38 is substantially void free, with the elastomer body free of intentional voids of nonelastomeric open space, preferably with the elastomer encasing and fully bonded to the shims and inner and outer member bonding surfaces so no void empty space is between the inner and outer member bonding surfaces of the nonelastomeric outer housing member and the nonelastomeric inner member. Preferably between the nonelastomeric inner member and the nonelastomeric outer member the linkend consists essentially of the elastomeric intermediate 38, preferably with the fully bonded inboard and outboard shims 44, 46, and preferably with the elastomeric intermediate fully bonded with the inner and outer member bonding surfaces 30, 34. Preferably the tiltrotor aircraft drivelink second linkend 24 has a second linkend cavity 28 with a second linkend cavity inner circumferential bonding surface 30. The second linkend 24 preferably includes a second linkend nonelastomeric inner member 32 contained in the second linkend cavity 28. The second linkend nonelastomeric inner member 32 has a second linkend outer circumferential bonding surface 34. The second linkend 24 preferably includes a second linkend elastomeric intermediate 38 having an outer circumferential elastomeric bonding surface 40 and an inner circumferential elastomeric bonding surface 42, with the outer circumferential elastomeric bonding surface 40 bonded to the second linkend cavity inner circumferential bonding surface 30 and the inner circumferential elastomeric bonding surface 42 bonded to the second linkend outer circumferential bonding surface 34. Preferably the second elastomeric intermediate contains N (N is preferably a whole number $\geq 2$) nonelastomeric first side outboard bonded shims 44 and no more than N-1 nonelastomeric second side inboard bonded shims 46, preferably with the shims encased in the elastomer with both their inner surfaces 48 and outer surfaces 50 bonded to elastomer. Preferably each shim has a bonded inside surface 48 and a bonded outside surface 50, preferably with the shims comprised of spherical shell segments, preferably comprised of metal. Preferably the inner member is fully bonded to the outer member, preferably with no intentional nonbonding of inner and outer surfaces, preferably with only bonded elastomer and shims in between the inner and outer surfaces of the inner and outer member. Preferably the elastomeric intermediate 38 contains no more than N-2 second side inboard shims 46. Preferably the first linkend nonelastomeric metal first side outboard bonded shims 44 extend around at least fifty percent of the first linkend nonelastomeric inner member outer circumferential bonding surface 34. Preferably the first linkend nonelastomeric metal second side inboard bonded shims 46 extend around less than fifty percent of the first linkend nonelastomeric inner member outer circumferential bonding surface 34. Preferably the first linkend nonelastomeric metal first side outboard bonded shims 44 have an arc segment of more than a 180 degree arc. Preferably the first linkend nonelastomeric metal second side inboard bonded shims 46 have an arc segment of less than a 180 degree arc. Preferably the second linkend nonelastomeric metal outboard bonded shims extend around at least fifty percent of the second linkend nonelastomeric inner member outer circumferential bonding surface and the second linkend nonelastomeric metal inboard bonded shims extend around less than fifty percent of the second linkend nonelastomeric inner member outer circumferential bonding surface, preferably with first side outboard bonded shims 44 having an arc segment of more than a 180 degree arc and the second side inboard bonded shims 46 having an arc segment of less than a 180 degree arc. Preferably the nonelastomeric outboard bonded shims 44 have outboard first arc ends 45 and distal outboard second arc ends 45', and the nonelastomeric inboard bonded shims 46 have inboard first arc ends 47 and distal inboard second arc ends 47', with a first intervening elastomeric wedge section 52 bonded between the outboard first arc ends 45 and the inboard first arc ends 47 and the inner member and outer members, and with a second intervening elastomeric section wedge 52 bonded between the outboard second arc ends 45' and the inboard second arc ends 47' and the inner member and the outer member. Preferably the intervening elastomeric section wedge 52 consists essentially of elastomer, preferably free of nonelastomeric members such as shims. In an alternative embodiment the section wedge 52 is comprised of elastomeric section defining a void space in the elastomer. Preferably the linkend outer nonelastomeric housing cavity and the linkend nonelastomeric inner member have aligned concentric axes, preferably with a common center axis of the housing cavity linkend inner circumferential bonding surface and the linkend nonelastomeric inner member outer circumferential bonding surface, preferably with the plurality of nonelastomeric shims having a common axis, in alignment with the common center axis of the housing cavity linkend inner circumferential bonding surface and the linkend nonelastomeric inner member outer circumferential bonding surface, preferably with the nonelastomeric shim inner and outer circumferential segment bonding surfaces having aligned concentric axes.

In an embodiment the invention includes a tiltrotor drivelink 20 as shown in FIGS. 1-7 and 13, the tiltrotor drivelink 20 includes a nonelastomeric outer drivelink member 26 with a first linkend 22 and a distal second linkend 24. The drivelink first linkend 22 has a first linkend cavity 28 with a first linkend cavity inner circumferential bonding surface 30, and a first linkend nonelastomeric inner member 32 contained in the first linkend cavity 28, the first linkend nonelastomeric inner member 32 having a first linkend outer circumferential bonding surface 34. The linkend 22 includes a first linkend elastomeric intermediate 38 having an outer circumferential elastomeric bonding surface 40 and an inner circumferential elastomeric bonding surface 42, the outer circumferential elastomeric bonding surface 40 bonded to the first linkend cavity inner circumferential bonding surface 30 and the inner circumferential elastomeric bonding surface 42 bonded to the first linkend outer circumferential bonding surface 34, the elastomeric intermediate 38 containing a plurality of first side shape factoring outboard bonded shims 44 which provide a first side outboard load area $LA_O$ and a first side outboard bulge area $BA_O$, and the elastomeric intermediate 38 contains a plurality of second side shape factoring inboard bonded shims 46 which provide a second side inboard load area $LA_I$ and a second side inboard bulge area $BA_I$.

In an embodiment the invention preferably includes the tiltrotor aircraft drivelink 20, with the tiltrotor aircraft drivelink including the nonelastomeric rigid longitudinally extending outer drivelink housing 26, preferably with the outer housing 26 comprised of a metal. Preferably the nonelastomeric rigid longitudinally extending outer drivelink housing member 26 includes the first linkend 22 and the distal second linkend 24. Preferably the drivelink first linkend 22 has first linkend cavity 28 with first linkend cavity inner circumferential bonding surface 30. Preferably first linkend nonelastomeric inner member 32 is contained in the first linkend cavity 28, with the first linkend nonelastomeric inner member 32 includes first linkend outer circumferential bonding surface 34. Preferably the drivelink first linkend 22 includes first linkend elastomeric intermediate 38 with outer circumferential elastomeric bonding surface 40 and inner circumferential elastomeric bonding surface 42, the outer circumferential elastomeric bonding surface 40 is bonded to the first linkend cavity inner circumferential bonding surface 30 and the inner circumferential elastomeric bonding surface 42 is bonded to the first linkend outer circumferential bonding surface 34. Preferably the elastomeric intermediate 38 contains a plurality of first side shape factoring outboard bonded shims 44 which provide an outboard load area $LA_O$ and an outboard bulge area $BA_O$, and the elastomeric intermediate 38 contains a plurality of second side shape factoring inboard bonded shims 46 which provide an inboard load area $LA_I$ and an inboard bulge area $BA_I$ wherein $(LA_O/BA_O)>(LA_I/BA_I)$. Preferably the linkend has a second side inboard shape factor less than the first side outboard shape factor, preferably with the elastomer fully bonded between the inner and outer members and the intervening shims spherical inner and outer surfaces. Preferably the shims are encased in elastomer with both inner surfaces 48 and outer surfaces 50 bonded to the elastomer 38. Preferably the linkend elastomeric intermediate 38 is substantially void free, with the elastomeric intermediate 38 free of intentional voids of nonelastomeric open space, preferably with the elastomer encasing and fully bonded to the shims 44, 46 and inner and outer members 32, 26, preferably with no void empty space between the inner and outer member bonding surfaces 30, 34. Preferably between inner and outer members 32, 26 the elastomeric intermediate 38 consists essentially of the elastomer and the inboard and outboard shims 44, 46. Preferably the tiltrotor aircraft drivelink second linkend 24 has a second linkend cavity 28 with a second linkend cavity inner circumferential bonding surface 30, and a second linkend nonelastomeric inner member 32 contained in the second linkend cavity, with the second linkend nonelastomeric inner member 32 having a second linkend outer circumferential bonding surface 34, and the second linkend elastomeric intermediate 38 having an outer circumferential elastomeric bonding surface 40 and an inner circumferential elastomeric bonding surface 42, with the outer circumferential elastomeric bonding surface bonded to the second linkend cavity inner circumferential bonding surface and the inner circumferential elastomeric bonding surface bonded to the second linkend outer circumferential bonding surface, with the second elastomeric intermediate 38 containing shims. Preferably the elastomeric intermediate 38 contains a plurality of first side shape factoring outboard bonded shims 44 which provide an outboard load area $LA_O$ and an outboard bulge area $BA_O$, and the elastomeric intermediate 38 contains a plurality of second side shape factoring inboard bonded shims 46 which provide an inboard load area $LA_I$ and an inboard bulge area $BA_I$ wherein $(LA_O/BA_O)>(LA_I/BA_I)$. Preferably the elastomeric intermediate 38 contains the N (N is a whole number $\geq 2$) nonelastomeric metal outboard bonded shims encased in and bonded to the elastomer and no more than N-1 nonelastomeric metal inboard bonded shim. Preferably each shim has a bonded inside surface 48 and a bonded outside surface 50, preferably with the shims are comprised of spherical shell segments. Preferably the inner member is fully bonded to the outer member, preferably with no intentional nonbonding of the inner and outer surfaces of the shims and the inner and outer members, preferably with only bonded elastomer and shims in between the inner and outer members. Preferably the elastomer contains N-2 inboard shims. Preferably the second linkend elastomeric intermediate contains a plurality of shape factoring outboard bonded shims which provide a second linkend outboard load area $LA_O$ and a second linkend outboard bulge area $BA_O$, the second linkend elastomeric intermediate containing a plurality of shape factoring inboard bonded shims which provide a second linkend inboard load area $LA_I$ and an inboard bulge area $BA_I$ wherein $(LA_O/BA_O)>(LA_I/BA_I)$. Preferably the first linkend nonelastomeric metal outboard bonded shims extend around at least fifty percent of the first linkend nonelastomeric inner member outer circumferential bonding surface and the first linkend nonelastomeric metal inboard bonded shims extend around less than fifty percent of the first linkend nonelastomeric inner member outer circumferential bonding surface, preferably with the first side outboard shims extending through more than a 180 degree arc and the second side inboard shims extending through less than a 180 degree arc. Preferably the second linkend nonelastomeric metal outboard bonded shims extend around at least fifty percent of the second linkend nonelastomeric inner member outer circumferential bonding surface and the second linkend nonelastomeric metal inboard bonded shims extend around less than fifty percent of the second linkend nonelastomeric inner member outer circumferential bonding surface, preferably with the outboard shims extending through more than a 180 degree arc and the inboard shims extending through less than a 180 degree arc.

Preferably the linkend nonelastomeric outboard bonded shims 44 have outboard first arc ends 45 and distal outboard second arc ends 45', and the first linkend nonelastomeric inboard bonded shims 46 have inboard first arc ends 47 and distal inboard second arc ends 47', with a first intervening elastomeric section wedge 52 bonded between the outboard first arc ends 45 and the inboard first arc ends 47 and the inner member and outer member as shown in FIGS. 1, 6, and 13. Preferably the linkends include a second intervening elastomeric section wedge 52 bonded between the outboard second arc ends 45' and the inboard second arc ends 47' and the inner member and outer member as shown in FIGS. 1, 6, and 13. Preferably the intervening elastomeric section wedge 52 consists essentially of elastomer, preferably free of nonelastomeric members such as shims. In an alternative embodiment the section wedge 52 includes a void space in the elastomer section.

In an embodiment the invention includes a drivelink 20 with a nonelastomeric rigid longitudinally extending outer drivelink member 26 with a first linkend 22 and a distal second linkend 24 shown in FIGS. 1-2, 7, and 13. The drivelink first linkend 22 having a first linkend cavity 28 with a first linkend cavity inner circumferential bonding surface 30 with a center bore axis 60, and a first linkend nonelastomeric inner member 32 contained in the first linkend cavity, the first linkend nonelastomeric inner member 32 having a first linkend outer circumferential bonding surface and an inner member center bore axis 60. The linkend includes a first linkend elastomeric intermediate 38 having an outer circumferential elastomeric bonding surface and an inner circumferential elastomeric bonding surface, the outer circumferential elastomeric bonding surface mold bonded to the first linkend cavity inner circumferential bonding surface and the inner circumferential elastomeric bonding surface mold bonded to the first linkend outer circumferential bonding surface, with the elastomeric intermediate 38 containing N nonelastomeric metal outboard bonded shims and no more than N-1 nonelastomeric metal inboard bonded shims with the first linkend cavity center bore axis 60 aligned with the inner member center bore axis 60.

Preferably the invention includes the drivelink 20. The drivelink 20 includes nonelastomeric rigid longitudinally extending outer drivelink housing member 26, preferably with a first linkend 22 and a distal second linkend 24. The drivelink first linkend 24 having first linkend cavity 28 with first linkend cavity inner circumferential bonding surface 30 with a center bore axis 60. The first linkend nonelastomeric inner member 32 is contained in the first linkend cavity, with the first linkend nonelastomeric inner member having a first linkend outer circumferential bonding surface and an inner member center bore axis 60. The linkend includes linkend elastomeric intermediate 38 having an outer circumferential elastomeric bonding surface and an inner circumferential elastomeric bonding surface, the outer circumferential elastomeric bonding surface bonded to the first linkend cavity inner circumferential bonding surface and the inner circumferential elastomeric bonding surface bonded to the first linkend outer circumferential bonding surface. The elastomeric intermediate 38 preferably contains N (N is preferably a whole number $\geq 2$) nonelastomeric metal first side outboard bonded shims, preferably encased in the elastomer with both inner 48 and outer 50 surfaces of the shims bonded to the elastomer, and preferably no more than N-1 nonelastomeric metal second side inboard bonded shims, preferably encased in the elastomer with both inner and outer surfaces of the shims bonded to the elastomer, with the linkend cavity center bore axis 60 aligned with the inner member center bore axis 60, preferably with concentric common axes 60, preferably with the cavity, the inner member, and the shims having a common concentric aligned axis 60. Preferably the linkend elastomeric intermediate is substantially void free, preferably free of intentional voids of nonelastomeric open space, preferably with the elastomer encasing and fully bonded to the shims and inner and outer member so as to inhibit a void empty space between the inner and outer member bonding surfaces, preferably with the linkend between the inner and outer member consisting essentially of the elastomeric intermediate 38 with the inboard and outboard shims 44, 46. Preferably the drivelink second linkend 24 has second linkend cavity 28 with the second linkend cavity inner circumferential bonding surface 30 with second linkend center bore axis 60. Preferably the second linkend nonelastomeric inner member 32 is contained in the second linkend cavity, with the second linkend nonelastomeric inner member having a second linkend outer circumferential bonding surface and a second linkend inner member center bore axis 60. Preferably the linkend includes second linkend elastomeric intermediate 38 having an outer circumferential elastomeric bonding surface and an inner circumferential elastomeric bonding surface, the outer circumferential elastomeric bonding surface bonded to the second linkend cavity inner circumferential bonding surface and the inner circumferential elastomeric bonding surface bonded to the second linkend outer circumferential bonding surface, with the second elastomeric intermediate containing N (N is a whole number $\geq 2$) nonelastomeric metal outboard bonded shims 44 encased in the elastomer with both inner and outer surfaces of the shims bonded to the elastomer, and preferably no more than N-1 nonelastomeric metal inboard bonded shims 46 encased in the elastomer with both inner and outer surfaces of shims bonded to the elastomer. Preferably each shim has a bonded inside surface 48 and a bonded outside surface 50, preferably comprised of spherical shell segments. Preferably the inner member 32 is fully bonded to the outer member 26, with no intentional nonbonding of the inner and outer surfaces, preferably with only bonded elastomer and shims in between. Preferably the number of inboard shims 46 is no more than N-2, and in an embodiment the number of inboard shims is N-2. Preferably the first linkend nonelastomeric metal outboard bonded shims extend around at least fifty percent of the first linkend nonelastomeric inner member outer circumferential bonding surface. Preferably the first linkend nonelastomeric metal inboard bonded shims extend around less than fifty percent of the first linkend nonelastomeric inner member outer circumferential bonding surface. Preferably the first side shims have an arc more than 180 degree and the second side shims have an arc less than 180 degree. Preferably the second linkend nonelastomeric first side outboard bonded shims extend around at least fifty percent of the second linkend nonelastomeric inner member outer circumferential bonding surface (more than 180 degree arc) and the second linkend nonelastomeric second side inboard bonded shims extend around less than fifty percent of the second linkend nonelastomeric inner member outer circumferential bonding surface (less than 180 degree arc). Preferably the first linkend nonelastomeric outboard bonded shims have outboard first arc ends and distal outboard second arc ends, and the first linkend nonelastomeric inboard bonded shims have inboard first arc ends and distal inboard second arc ends, with a first intervening elastomeric section wedge bonded between the outboard first arc ends and the inboard first arc ends, and the inner member and outer member, with a second intervening elastomeric section wedge bonded between the outboard second arc ends and the inboard second arc ends, and the inner member and outer member. Preferably the intervening elastomeric section wedge consists essentially of elastomer, preferably free of nonelastomeric members such as shims. In an alternative embodiment the section wedge includes a void space in the elastomer section 52. Preferably the second linkend nonelastomeric outboard bonded shims have outboard first arc ends and distal outboard second arc ends, and the second linkend nonelastomeric inboard bonded shims have inboard first arc ends and distal inboard second arc ends, with a second linkend first intervening elastomeric section wedge bonded between the outboard first arc ends and the inboard first arc ends, and the inner member and outer member, with a second linkend second intervening elastomeric section wedge bonded between the outboard second arc ends and the inboard second arc ends, and the inner member and outer member, preferably with the intervening elastomeric section wedge consisting essentially of elastomer, preferably free of nonelastomeric members such as shims. In an alternative embodiment the section wedge consisting essentially of elastomer and includes a void space in the elastomer. Preferably the linkend outer nonelastomeric housing cavity and the linkend nonelastomeric inner member have aligned concentric axes 60, preferably with a common center axis 60 of the housing cavity linkend inner circumferential bonding surface and the linkend nonelastomeric inner member outer circumferential bonding surface, preferably with the plurality of nonelastomeric shims having a common axis 60, in alignment with the common center axis 60 of the housing cavity linkend inner circumferential bonding surface and the linkend nonelastomeric inner member outer circumferential bonding surface, preferably with the nonelastomeric shim inner and outer circumferential segment bonding surfaces having aligned concentric axes 60.

In an embodiment the invention includes a drivelink with a nonelastomeric outer drivelink member with a first linkend and a distal second linkend. The drivelink first linkend has a first linkend cavity with a first linkend cavity inner circumferential bonding surface, and a first linkend nonelastomeric inner member contained in the first linkend cavity, the first linkend nonelastomeric inner member having a first linkend outer circumferential bonding surface, and a first linkend elastomeric intermediate having an outer circumferential elastomeric bonding surface and an inner circumferential elastomeric bonding surface, the outer circumferential elastomeric bonding surface bonded to the first linkend cavity inner circumferential bonding surface and the inner circumferential elastomeric bonding surface bonded to the first linkend outer circumferential bonding surface. The elastomeric intermediate contains N nonelastomeric metal inboard bonded shims and no more than N-1 nonelastomeric metal outboard bonded shims.

In an embodiment invention preferably includes drivelink 20. Drivelink 20 including the nonelastomeric rigid longitudinally extending outer drivelink housing member 26 with first linkend 22 and distal second linkend 24. The drivelink first linkend having first linkend cavity 28 with first linkend cavity inner circumferential bonding surface 30, and first linkend nonelastomeric inner member 32 contained in the first linkend cavity, with the first linkend nonelastomeric inner member having a first linkend outer circumferential bonding surface 34. The drivelink includes first linkend elastomeric intermediate 38 having outer circumferential elastomeric bonding surface 40 and inner circumferential elastomeric bonding surface 42, the outer circumferential elastomeric bonding surface bonded to the first linkend cavity inner circumferential bonding surface and the inner circumferential elastomeric bonding surface bonded to the first linkend outer circumferential bonding surface. Preferably the elastomeric intermediate containing N (N is a whole number $\geq 2$) nonelastomeric inboard bonded shims and no more than N-1 nonelastomeric outboard bonded shims encased in elastomer with both inner and outer surfaces of the shims bonded to the elastomer. Preferably the drivelink second linkend 24 has a second linkend cavity with a second linkend cavity inner circumferential bonding surface, and a second linkend nonelastomeric inner member contained in the second linkend cavity, the second linkend nonelastomeric inner member having a second linkend outer circumferential bonding surface, and a second linkend elastomeric intermediate having an outer circumferential elastomeric bonding surface and an inner circumferential elastomeric bonding surface, the outer circumferential elastomeric bonding surface bonded to the second linkend cavity inner circumferential bonding surface and the inner circumferential elastomeric bonding surface bonded to the second linkend outer circumferential bonding surface, with the second elastomeric intermediate containing N (N is a whole number $\geq 2$) nonelastomeric inboard bonded shims and no more than N-1 nonelastomeric outboard bonded shims, preferably encased in the elastomer with both inner and outer surfaces of the shims bonded to the elastomer. Preferably each shim has a bonded inside surface and a bonded outside surface, preferably comprised of spherical shell segments. Preferably the inner member is fully bonded to the outer member, with no intentional nonbonding of inner and outer surface, preferably only bonded elastomer and shims in between the inner member 32 and the outer member 26. Preferably the first linkend nonelastomeric outboard bonded shims have outboard first arc ends and distal outboard second arc ends, and the first linkend nonelastomeric inboard bonded shims have inboard first arc ends and distal inboard second arc ends, with a first intervening elastomeric section bonded between the outboard first arc ends and the inboard first arc ends, with a second intervening elastomeric section bonded between the outboard second arc ends and the inboard second arc ends. Preferably the second linkend nonelastomeric outboard bonded shims have outboard first arc ends and distal outboard second arc ends, and the second linkend nonelastomeric inboard bonded shims have inboard first arc ends and distal inboard second arc ends, with a second linkend first intervening elastomeric section bonded between the outboard first arc ends and the inboard first arc ends, with a second linkend second intervening elastomeric section bonded between the outboard second arc ends and the inboard second arc ends. Preferably the linkend outer nonelastomeric housing cavity and the linkend nonelastomeric inner member have aligned concentric axes 60, preferably with a common center axis 60 of the housing cavity linkend inner circumferential bonding surface and the linkend nonelastomeric inner member outer circumferential bonding surface, preferably with the plurality of nonelastomeric shims having a common axis 60, in alignment with the common center axis 60 of the housing cavity linkend inner circumferential bonding surface and the linkend nonelastomeric inner member outer circumferential bonding surface, preferably with the nonelastomeric shim inner and outer circumferential segment bonding surfaces having aligned concentric axes 60.

In an embodiment the invention includes a linkend with a nonelastomeric outer link housing member, the linkend having a linkend cavity with a linkend cavity inner circumferential bonding surface, and a linkend nonelastomeric inner member contained in the linkend cavity, the linkend nonelastomeric inner member having a linkend outer circumferential bonding surface, and a linkend elastomeric intermediate having an outer circumferential elastomeric bonding surface and an inner circumferential elastomeric bonding surface, the outer circumferential elastomeric bonding surface bonded to the linkend cavity inner circumferential bonding surface and the inner circumferential elastomeric bonding surface bonded to the linkend outer circumferential bonding surface, the elastomeric intermediate containing a plurality of shape factoring first side bonded shims which provide a first side load area $LA_O$ and a first side bulge area $BA_O$, the elastomeric intermediate containing a plurality of shape factoring second side bonded shims which provide a second side load area $LA_I$ and an second side bulge area $BA_I$ wherein $(LA_O/BA_O) \neq (LA_I/BA_I)$.

In an embodiment the invention preferably includes the linkend with the linkend including the nonelastomeric rigid, preferably metal, outer link housing member 26. The linkend having a linkend cavity 28 with a linkend cavity inner circumferential bonding surface 30, and a linkend nonelastomeric inner member 32 contained in the linkend cavity 28, with the linkend nonelastomeric inner member having a linkend outer circumferential bonding surface 34. The linkend includes the linkend elastomeric intermediate 38 having an outer circumferential elastomeric bonding surface 40 and an inner circumferential elastomeric bonding surface 42, the outer circumferential elastomeric bonding surface bonded to the linkend cavity inner circumferential bonding surface and the inner circumferential elastomeric bonding surface bonded to the linkend outer circumferential bonding surface. The elastomeric intermediate 38 preferably contains a plurality of shape factoring first side outboard bonded shims 44 which provide a first side outboard load area $LA_O$ and a first side outboard bulge area $BA_O$, and the elastomeric intermediate containing a plurality of shape factoring second side inboard bonded shims 46 which provide a second side inboard load area $LA_I$ and an second side inboard bulge area $BA_I$ wherein $(LA_O/BA_O) > (LA_I/BA_I)$. Preferably the elastomer and nonelastomers are mold bonded together, preferably with the shims encased in elastomer with both inner and outer surfaces of the shims bonded to elastomer. Preferably the first linkend has an inboard shape factor less than the outboard shape factor, preferably with the elastomer fully bonded between the inner and outer member and the intervening shims spherical surfaces. Preferably the linkend elastomeric intermediate 38 is substantially void free, free of intentional voids of nonelastomeric open space, preferably with the elastomer encasing and fully bonded to the shims and inner and outer member so as to inhibit a void empty space between the inner and outer member bonding surfaces, preferably between the inner and outer members the linkend consists essentially of the elastomeric intermediate and the inboard and outboard shims. Preferably each shim has a bonded inside surface 48 and a bonded outside surface 50, preferably comprised of spherical shell segments. Preferably the inner member 32 is fully bonded to the outer member 26, preferably with no intentional nonbonding of the inner and outer surfaces, and preferably with only bonded elastomer and shims in between. Preferably the linkend elastomeric intermediate 38 includes N outboard shims and preferably no more than N-1 inboard shims, preferably no more than N-2. Preferably the first side metal outboard bonded shims extend around at least fifty percent of the first linkend nonelastomeric inner member outer circumferential bonding surface and the second side nonelastomeric metal inboard) bonded shims extend around less than fifty percent of the linkend nonelastomeric inner member outer circumferential bonding surface (more than 180 degree arc and less than 180 degree arc). Preferably the first side nonelastomeric bonded shims have first side first arc ends and distal second arc ends, and the second side nonelastomeric bonded shims have second side first arc ends and distal second arc ends, with a first intervening elastomeric section wedge bonded between the first side first arc ends and the second side first arc ends, and the inner member and outer member, with a second intervening elastomeric section wedge bonded between the first side second arc ends and the second side second arc ends, and the inner member and outer member. Preferably the intervening elastomeric section wedge consists essentially of elastomer, and preferably is free of nonelastomeric members such as shims. In an alternative embodiment the section wedge includes a void space in the elastomer section. Preferably $(LA_O/BA_O) \geq 1.05(LA_I/BA_I)$. Preferably $(LA_O/BA_O) \geq 1.1(LA_I/BA_I)$. Preferably $(LA_O/BA_O) \geq 1.25(LA_I/BA_I)$. Preferably $(LA_O/BA_O) \geq 1.35(LA_I/BA_I)$. Preferably $(LA_O/BA_O) \geq 1.40(LA_I/BA_I)$. Preferably $(LA_O/BA_O) \geq 1.45(LA_I/BA_I)$. Preferably $(LA_O/BA_O) \geq 1.50(LA_I/BA_I)$. Preferably $(LA_O/BA_O) \geq 1.55(LA_I/BA_I)$. Preferably $(LA_O/BA_O) \geq 1.60(LA_I/BA_I)$. Preferably the elastomeric intermediate 38 contains N (with N preferably a whole number $\geq 2$) nonelastomeric metal first side bonded shims encased in the elastomer with both inner and outer surfaces of the shims bonded to the elastomer, and no more than N-1 nonelastomeric metal second side bonded shims encased in the elastomer with both inner and outer surfaces of the shims bonded to the elastomer.

In an embodiment the invention preferably includes a link coupling for transmitting torque between rotatable drive and driven members while accommodating angular misalignment between their rotational axes, with the link coupling including a plurality of drivelinks 20 for interconnecting the drive and driven members so that the drivelinks 20 can move independently as they advance tangentially about the axes, the drivelinks 20 including first drivelink ends 22, with the first drivelink ends 22 including the nonelastomeric outer link housing member 26 with the linkend cavity 28 with the linkend cavity inner bonding surface 30, and the linkend nonelastomeric inner member 32 contained in the linkend cavity, with the linkend nonelastomeric inner member 32 having the linkend outer bonding surface 34. The drivelinks 20 including linkend elastomeric intermediate 38 having outer elastomeric bonding surface 40 and inner elastomeric bonding surface 42, the outer elastomeric bonding surface bonded to the linkend cavity inner bonding surface and the inner elastomeric bonding surface bonded to the linkend outer bonding surface. The elastomeric intermediate 38 having the shape factor first side with the first side load area $LA_O$ and a first side bulge area $BA_O$, the elastomeric intermediate having the shape factor second side with the second side load area $LA_I$ and the second side bulge area $BA_I$ wherein $(LA_O/BA_O)>(LA_I/BA_I)$. The drivelinks 20 having the distal second drivelink ends 24, with the second drivelink ends 24 including the nonelastomeric outer link housing member 26 with the linkend cavity 28 with the linkend cavity inner bonding surface 30, and the linkend nonelastomeric inner member 32 contained in the linkend cavity, the linkend nonelastomeric inner member having the linkend outer bonding surface 34, and the linkend elastomeric intermediate having the outer elastomeric bonding surface 40 and the inner elastomeric bonding surface 42, the outer elastomeric bonding surface bonded to the linkend cavity inner bonding surface and the inner elastomeric bonding surface bonded to the linkend outer bonding surface, with the elastomeric intermediate 38 having the shape factor first side with the first side load area $LA_O$ and the first side bulge area $BA_O$, the elastomeric intermediate having the shape factor second side with the second side load area $LA_I$ and the second side bulge area $BA_I$ wherein $(LA_O/BA_O)>(LA_I/BA_I)$, with the drivelinks 20 providing a link motion to effect a substantially constant velocity connection between the rotatable drive and driven members when misaligned, preferably with the drivelinks 20 providing a negative torque capacity for reacting a negative torque through the link coupling. The drivelinks 20 and linkends with the fully bonded linkend elastomeric intermediates 38 provide for a beneficial coupling between the rotatable drive and driven members.

In an embodiment the invention preferably includes a tiltrotor aircraft link coupling for transmitting torque between rotatable drive and driven members while accommodating angular misalignment between their rotational axes. The link coupling including a plurality of the drivelinks 20 for interconnecting the drive and driven members so that the drivelinks 20 can move independently as they advance tangentially about the axes, the drivelinks 20 including first drivelink ends 22, with the first drivelink ends 22 including the nonelastomeric outer link housing member 26 with the linkend cavity 28 with the linkend cavity inner bonding surface 30. The drivelinks 20 include the linkend nonelastomeric inner member 32 contained in the linkend cavity 28, the linkend nonelastomeric inner member 32 having the linkend outer bonding surface 34, and the linkend elastomeric intermediate 38 having the outer elastomeric bonding surface 40 and the inner elastomeric bonding surface 42, the outer elastomeric bonding surface 40 bonded to the linkend cavity inner bonding surface and the inner elastomeric bonding surface 42 bonded to the linkend outer bonding surface. The elastomeric intermediate 38 having the shape factor first side with the first side outboard load area $LA_O$ and the first side outboard bulge area $BA_O$, the elastomeric intermediate having the shape factor second side with the second side inboard load area $LA_I$ and the second side inboard bulge area $BA_I$ wherein $(LA_O/BA_O)>(LA_I/BA_I)$. The drivelinks 20 include the distal second drivelink ends 24, with the second drivelink ends 24 including the nonelastomeric outer link housing member 26 with the linkend cavity 28 with the linkend cavity inner bonding surface 30, and the linkend nonelastomeric inner member 32 contained in the linkend cavity. The linkend nonelastomeric inner member 32 having the linkend outer bonding surface 34, and the linkend elastomeric intermediate 38 having the outer elastomeric bonding surface 40 and the inner elastomeric bonding surface 42, the outer elastomeric bonding surface 40 bonded to the linkend cavity inner bonding surface 30 and the inner elastomeric bonding surface 42 bonded to the linkend outer bonding surface 34, the elastomeric intermediate 38 having the shape factor first side with the first side outboard load area $LA_O$ and the first side outboard bulge area $BA_O$, the elastomeric intermediate having the shape factor second side with the second side inboard load area $LA_I$ and the second side inboard bulge area $BA_I$ wherein $(LA_O/BA_O)>(LA_I/BA_I)$, with the drivelinks 20 providing a link motion to effect a substantially constant velocity connection between the rotatable drive and driven members when misaligned, preferably with the drivelinks 20 providing a negative torque capacity for reacting a negative torque through the tiltrotor aircraft link coupling. The rotor aircraft drivelinks 20 and linkends with the preferably fully bonded linkend elastomeric intermediates 38 provide for a beneficial coupling between the tiltrotor aircraft rotatable drive and driven members.

In an embodiment the invention includes a tiltrotor aircraft drivelink 20, said tiltrotor aircraft drivelink 20 comprised of a nonelastomeric outer drivelink member 26 with a first linkend 22 and a distal second linkend 24, said tiltrotor aircraft drivelink first linkend 22 having a first linkend cavity 28 with a first linkend cavity inner circumferential bonding surface 30, and a first linkend nonelastomeric inner member 32 contained in said first linkend cavity 28, said first linkend nonelastomeric inner member 32 having a first linkend outer circumferential bonding surface 34, and a first linkend elastomeric intermediate 38 having an outer circumferential elastomeric bonding surface 40 and an inner circumferential elastomeric bonding surface 42, said outer circumferential elastomeric bonding surface 40 bonded to said first linkend cavity inner circumferential bonding surface 30 and said inner circumferential elastomeric bonding surface 42 bonded to said first linkend outer circumferential bonding surface 34, said elastomeric intermediate 38 containing N nonelastomeric outboard bonded shims 44 and no more than N-1 nonelastomeric inboard bonded shims 46, said tiltrotor aircraft drivelink second linkend 24 having a second linkend cavity 28 with a second linkend cavity inner circumferential bonding surface 30, and a second linkend nonelastomeric inner member 32 contained in said second linkend cavity 28, said second linkend nonelastomeric inner member 32 having a second linkend outer circumferential bonding surface 34, and a second linkend elastomeric intermediate 38 having an outer circumferential elastomeric bonding surface 40 and an inner circumferential elastomeric bonding surface 42, said outer circumferential elastomeric bonding surface 40 bonded to said second linkend cavity inner circumferential bonding surface 30 and said inner circumferential elastomeric bonding surface 42 bonded to said second linkend outer circumferential bonding surface 34, said second elastomeric intermediate containing N nonelastomeric outboard bonded shims 44 and no more than N-1 nonelastomeric inboard bonded shims 46, and wherein said second linkend nonelastomeric outboard bonded shims 44 have outboard first arc ends 45 and distal outboard second arc ends 45', and said second linkend nonelastomeric inboard bonded shims 46 have inboard first arc ends 47 and distal inboard second arc ends 47', with a second linkend first intervening elastomeric section 52 bonded between said outboard first arc ends 45 and said inboard first arc ends 47 with a second linkend second intervening elastomeric section 52 bonded between said outboard second arc ends 45' and said inboard second arc ends 47'.

In an embodiment the invention includes a drivelink 20, said drivelink 20 comprised of a nonelastomeric outer drivelink member 26 with a first linkend 22 and a distal second linkend 24, said drivelink first linkend 22 having a first linkend cavity 28 with a first linkend cavity inner circumferential bonding surface 30, and a first linkend nonelastomeric inner member 32 contained in said first linkend cavity 28, said first linkend nonelastomeric inner member 32 having a first linkend outer circumferential bonding surface, and a first linkend elastomeric intermediate 38 having an outer circumferential elastomeric bonding surface and an inner circumferential elastomeric bonding surface, said outer circumferential elastomeric bonding surface bonded to said first linkend cavity inner circumferential bonding surface and said inner circumferential elastomeric bonding surface bonded to said first linkend outer circumferential bonding surface, said elastomeric intermediate 38 containing N nonelastomeric outboard bonded shims 44 and no more than N−1 nonelastomeric inboard bonded shims 46, said drivelink second linkend 24 having a second linkend cavity 28 with a second linkend cavity inner circumferential bonding surface 30, and a second linkend nonelastomeric inner member 32 contained in said second linkend cavity 28, said second linkend nonelastomeric inner member 32 having a second linkend outer circumferential bonding surface 34, and a second linkend elastomeric intermediate 38 having an outer circumferential elastomeric bonding surface 40 and an inner circumferential elastomeric bonding surface 42, said outer circumferential elastomeric bonding surface 40 bonded to said second linkend cavity inner circumferential bonding surface 30 and said inner circumferential elastomeric bonding surface 42 bonded to said second linkend outer circumferential bonding surface 34, said second elastomeric intermediate containing N nonelastomeric outboard bonded shims 44 and no more than N-1 nonelastomeric inboard bonded shims 46, and wherein said second linkend nonelastomeric outboard bonded shims 44 have outboard first arc ends 45 and distal outboard second arc ends 45', and said second linkend nonelastomeric inboard bonded shims 46 have inboard first arc ends 47 and distal inboard second arc ends 47', with a second linkend first intervening elastomeric section 52 bonded between said outboard first arc ends 45 and said inboard first arc ends 47, with a second linkend second intervening elastomeric section 52 bonded between said outboard second arc ends 45' and said inboard second arc ends 47'.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents. It is intended that the scope of differing terms or phrases in the claims may be fulfilled by the same or different structure(s) or step(s).

The invention claimed is:

1. A tiltrotor aircraft drivelink, said tiltrotor aircraft drivelink comprised of a nonelastomeric outer drivelink member with a first linkend and a distal second linkend, said tiltrotor aircraft drivelink first linkend having a first linkend cavity with a first linkend cavity inner circumferential bonding surface,
and a first linkend nonelastomeric inner member contained in said first linkend cavity, said first linkend nonelastomeric inner member having a first linkend outer circumferential bonding surface,
and a first linkend elastomeric intermediate having an outer circumferential elastomeric bonding surface and an inner circumferential elastomeric bonding surface, said outer circumferential elastomeric bonding surface bonded to said first linkend cavity inner circumferential bonding surface and said inner circumferential elastomeric bonding surface bonded to said first linkend outer circumferential bonding surface,
said elastomeric intermediate containing N nonelastomeric outboard bonded shims and no more than N−1 nonelastomeric inboard bonded shims,
said tiltrotor aircraft drivelink second linkend having a second linkend cavity with a second linkend cavity inner circumferential bonding surface, and a second linkend nonelastomeric inner member contained in said second linkend cavity,
said second linkend nonelastomeric inner member having a second linkend outer circumferential bonding surface,
and a second linkend elastomeric intermediate having an outer circumferential elastomeric bonding surface and an inner circumferential elastomeric bonding surface, said outer circumferential elastomeric bonding surface bonded to said second linkend cavity inner circumferential bonding surface and said inner circumferential elastomeric bonding surface bonded to said second linkend outer circumferential bonding surface,
said second elastomeric intermediate containing N nonelastomeric outboard bonded shims and no more than N−1 nonelastomeric inboard bonded shims.

2. A tiltrotor aircraft drivelink as claimed in claim 1, wherein said first linkend nonelastomeric outboard bonded shims extend around at least fifty percent of said first linkend nonelastomeric inner member outer circumferential bonding surface and said first linkend nonelastomeric inboard bonded shims extend around less than fifty percent of said first linkend nonelastomeric inner member outer circumferential bonding surface.

3. A tiltrotor aircraft drivelink as claimed in claim 1, wherein said second linkend nonelastomeric outboard bonded shims extend around at least fifty percent of said second linkend nonelastomeric inner member outer circumferential bonding surface and said second linkend nonelastomeric inboard bonded shims extend around less than fifty percent of said second linkend nonelastomeric inner member outer circumferential bonding surface.

4. A tiltrotor aircraft drivelink as claimed in claim 1, wherein said first linkend nonelastomeric outboard bonded shims have outboard first arc ends and distal outboard second arc ends,
and said first linkend nonelastomeric inboard bonded shims have inboard first arc ends and distal inboard second arc ends,
with a first intervening elastomeric section bonded between said outboard first arc ends and said inboard first arc ends,
with a second intervening elastomeric section bonded between said outboard second arc ends and said inboard second arc ends.

5. A tiltrotor aircraft drivelink as claimed in claim 1, wherein said second linkend nonelastomeric outboard bonded shims have outboard first arc ends and distal outboard second arc ends,
and said second linkend nonelastomeric inboard bonded shims have inboard first arc ends and distal inboard second arc ends,
with a second linkend first intervening elastomeric section bonded between said outboard first arc ends and said inboard first arc ends with a second linkend second intervening elastomeric section bonded between said outboard second arc ends and said inboard second arc ends.

6. A drivelink, said drivelink comprised of a nonelastomeric outer drivelink member with a first linkend and a distal second linkend, said drivelink first linkend having a first linkend cavity with a first linkend cavity inner circumferential bonding surface, and a first linkend nonelastomeric inner member contained in said first linkend cavity, said first linkend nonelastomeric inner member having a first linkend outer circumferential bonding surface, and a first linkend elastomeric intermediate having an outer circumferential elastomeric bonding surface and an inner circumferential elastomeric bonding surface, said outer circumferential elastomeric bonding surface bonded to said first linkend cavity inner circumferential bonding surface and said inner circumferential elastomeric bonding surface bonded to said first linkend outer circumferential bonding surface, said elastomeric intermediate containing N nonelastomeric outboard bonded shims and no more than N−1 nonelastomeric inboard bonded shims, said drivelink second linkend having a second linkend cavity with a second linkend cavity inner circumferential bonding surface, and a second linkend nonelastomeric inner member contained in said second linkend cavity, said second linkend nonelastomeric inner member having a second linkend outer circumferential bonding surface, and a second linkend elastomeric intermediate having an outer circumferential elastomeric bonding surface and an inner circumferential elastomeric bonding surface, said outer circumferential elastomeric bonding surface bonded to said second linkend cavity inner circumferential bonding surface and said inner circumferential elastomeric bonding surface bonded to said second linkend outer circumferential bonding surface, said second elastomeric intermediate containing N nonelastomeric outboard bonded shims and no more than N−1 nonelastomeric inboard bonded shims.

7. A drivelink as claimed in claim 6, wherein said first linkend nonelastomeric outboard bonded shims have outboard first arc ends and distal outboard second arc ends, and said first linkend nonelastomeric inboard bonded shims have inboard first arc ends and distal inboard second arc ends, with a first intervening elastomeric section bonded between said outboard first arc ends and said inboard first arc ends, with a second intervening elastomeric section bonded between said outboard second arc ends and said inboard second arc ends.

8. A drivelink as claimed in claim 6, wherein said second linkend nonelastomeric outboard bonded shims have outboard first arc ends and distal outboard second arc ends, and said second linkend nonelastomeric inboard bonded shims have inboard first arc ends and distal inboard second arc ends, with a second linkend first intervening elastomeric section bonded between said outboard first arc ends and said inboard first arc ends, with a second linkend second intervening elastomeric section bonded between said outboard second arc ends and said inboard second arc ends.

* * * * *